(12) United States Patent
Jeong et al.

(10) Patent No.: US 11,321,040 B2
(45) Date of Patent: May 3, 2022

(54) DISPLAY DEVICE, USER TERMINAL DEVICE, METHOD FOR CONTROLLING DISPLAY DEVICE, AND METHOD FOR CONTROLLING USER TERMINAL DEVICE

(71) Applicant: SAMSUNG ELECTRONICS CO., LTD., Suwon-si (KR)

(72) Inventors: Seungyeon Jeong, Suwon-si (KR); Dongwook Han, Suwon-si (KR); Kyoungmin Kim, Suwon-si (KR); Daegyu Bae, Suwon-si (KR); Geunsam Yang, Suwon-si (KR); Sukun Yoon, Suwon-si (KR); Kangil Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 7 days.

(21) Appl. No.: 16/588,078

(22) Filed: Sep. 30, 2019

(65) Prior Publication Data
US 2020/0333995 A1    Oct. 22, 2020

(30) Foreign Application Priority Data

Apr. 18, 2019 (KR) .................. 10-2019-0045703
Sep. 9, 2019 (KR) .................. 10-2019-0111452

(51) Int. Cl.
| | |
|---|---|
| *G06F 3/14* | (2006.01) |
| *G06F 3/16* | (2006.01) |
| *G11B 27/34* | (2006.01) |
| *H04N 21/41* | (2011.01) |
| *H04N 21/431* | (2011.01) |

(Continued)

(52) U.S. Cl.
CPC ............ *G06F 3/1423* (2013.01); *G06F 3/165* (2013.01); *G11B 27/34* (2013.01)

(58) Field of Classification Search
USPC .................. 386/200–234, 239–248, 353–357
See application file for complete search history.

(56) References Cited

U.S. PATENT DOCUMENTS

| | | |
|---|---|---|
| 7,769,345 B2 | 8/2010 | Johnson et al. |
| 8,682,248 B2 | 3/2014 | Jeon et al. |

(Continued)

FOREIGN PATENT DOCUMENTS

| | | |
|---|---|---|
| EP | 2648118 A2 | 10/2013 |
| JP | 2016-225952 A | 12/2016 |

(Continued)

OTHER PUBLICATIONS

Anonymous, "Portable Bluetooth Speaker—Sony SRS-XB20", Aug. 6, 2018, Retrieved from https://dgsressay.tistory.com/56, (19 pages total).

(Continued)

*Primary Examiner* — Hung Q Dang
(74) *Attorney, Agent, or Firm* — Sughrue Mion, PLLC

(57) ABSTRACT

The present disclosure relates to a display device, a user terminal device, a method for controlling a display device, and a method for controlling a user terminal device. The disclosure relates to a method in which a display device outputs content that is being output via a user terminal device based on a content request event associated with a request for the display device to output information associated with content that is being output via the user terminal device.

18 Claims, 22 Drawing Sheets

(51) Int. Cl.
*H04N 21/435* (2011.01)
*H04N 21/4363* (2011.01)

(56) References Cited

U.S. PATENT DOCUMENTS

| | | | |
|---|---|---|---|
| 8,775,850 B2 | 7/2014 | Moy | |
| 9,055,257 B2 | 6/2015 | Jeon et al. | |
| 9,077,930 B2 | 7/2015 | Jeon et al. | |
| 9,253,522 B2 | 2/2016 | Lee | |
| 9,277,576 B2 | 3/2016 | Ko et al. | |
| 9,535,561 B2 | 1/2017 | Park et al. | |
| 10,108,392 B2 | 10/2018 | So et al. | |
| 2012/0092284 A1* | 4/2012 | Rofougaran | H04M 1/725 345/173 |
| 2013/0125018 A1 | 5/2013 | Park et al. | |
| 2014/0018000 A1* | 1/2014 | Seymour | H04W 48/16 455/41.2 |
| 2014/0269614 A1* | 9/2014 | Maguire | H04L 65/80 370/331 |
| 2015/0082241 A1 | 3/2015 | Kang et al. | |
| 2015/0181306 A1* | 6/2015 | Innes | H04N 21/4126 725/74 |
| 2015/0181333 A1* | 6/2015 | Lee | H04R 3/002 381/71.1 |
| 2015/0312514 A1* | 10/2015 | Kondo | H04N 21/426 348/569 |
| 2016/0063673 A1* | 3/2016 | Lim | G06T 3/4007 345/660 |
| 2016/0088346 A1 | 3/2016 | Jeon et al. | |
| 2016/0124703 A1 | 5/2016 | So et al. | |
| 2016/0196097 A1* | 7/2016 | Gao | H04N 21/632 345/2.3 |
| 2016/0241919 A1 | 8/2016 | Jeon et al. | |
| 2016/0285839 A1* | 9/2016 | Kunihiro | H04L 9/321 |
| 2017/0026686 A1* | 1/2017 | Glazier | H04N 21/4438 |
| 2017/0085938 A1* | 3/2017 | Yeom | H04N 21/43637 |
| 2017/0109009 A1* | 4/2017 | Meredith | H04L 67/16 |
| 2017/0220311 A1* | 8/2017 | Oh | G06F 3/04847 |
| 2017/0244703 A1* | 8/2017 | Lee | G06K 9/0008 |
| 2017/0255345 A1* | 9/2017 | Veeramani | G06F 11/00 |
| 2017/0311025 A1* | 10/2017 | Kim | H04N 21/4432 |
| 2018/0027357 A1 | 1/2018 | Kwon | |
| 2018/0109947 A1* | 4/2018 | Kim | G06F 21/33 |
| 2018/0160179 A1 | 6/2018 | Jeon et al. | |
| 2018/0270540 A1 | 9/2018 | Jeon et al. | |
| 2018/0364881 A1* | 12/2018 | Lee | G06F 3/0484 |
| 2019/0014373 A1* | 1/2019 | Shin | H04N 21/436 |
| 2019/0018637 A1 | 1/2019 | Cheon et al. | |
| 2019/0086991 A1* | 3/2019 | Lee | G06F 3/0346 |
| 2019/0146744 A1* | 5/2019 | Chun | G09G 5/14 345/592 |

FOREIGN PATENT DOCUMENTS

| | | |
|---|---|---|
| KR | 10-2012-0018929 A | 3/2012 |
| KR | 10-2012-0093746 A | 8/2012 |
| KR | 10-2013-0113983 A | 10/2013 |
| KR | 10-2014-0033677 A | 3/2014 |
| KR | 10-1388148 B1 | 4/2014 |
| KR | 10-2014-0052232 A | 5/2014 |
| KR | 10-1423846 B1 | 7/2014 |
| KR | 10-2015-0032066 A | 3/2015 |
| KR | 10-2016-0053415 A | 5/2016 |
| KR | 10-2017-0081489 A | 7/2017 |
| KR | 10-1816930 B1 | 1/2018 |
| KR | 10-1870996 B1 | 6/2018 |
| WO | 2017/015044 A1 | 1/2017 |

OTHER PUBLICATIONS

Sang-woo LEE, "Electrostatic speaker BenQ treVolo S producing attractive high note", Mar. 20, 2018, Retrieved from: http://it.donga.com/27529/, (8 pages total).

Communication dated Sep. 28, 2020 by the Korean Intellectual Property Office in counterpart Korean Patent Application No. 10-2019-0111452.

Communication dated Apr. 30, 2021 issued by the Korean Intellectual Property Office in counterpart Korean Application No. 10-2019-0111452.

Communication dated Jun. 28, 2021 issued by the European Intellectual Property Office in counterpart European Application No. 19 200 575.9.

International Search Report (PCT/ISA/210), issued by International Searching Authority in corresponding International Application No. PCT/KR2019/012680, dated Jan. 17, 2020.

Communication dated Dec. 20, 2019, from the European Patent Office in counterpart European Application No. 1920575.9.

Written Opinion (PCT/ISA/237) issued by the International Searching Authority in corresponding International Application No. PCT/KR2019/012680, dated Jan. 17, 2020.

* cited by examiner

FIG. 8A
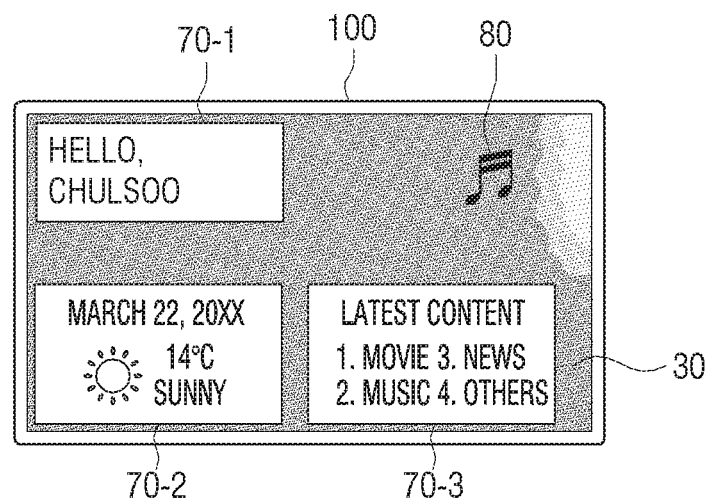
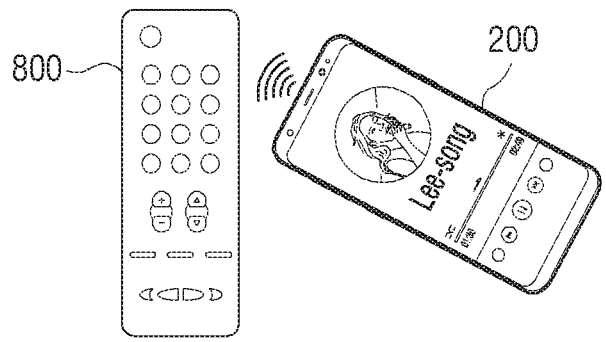

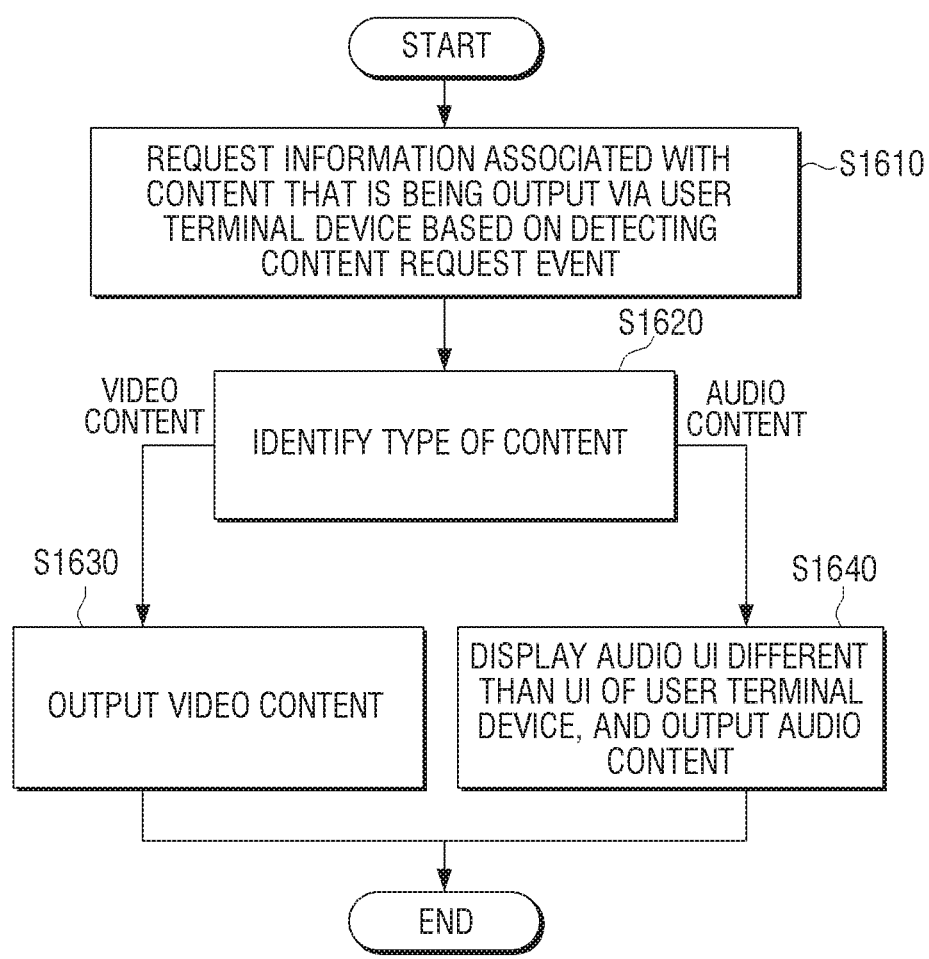

DISPLAY DEVICE, USER TERMINAL DEVICE, METHOD FOR CONTROLLING DISPLAY DEVICE, AND METHOD FOR CONTROLLING USER TERMINAL DEVICE

CROSS-REFERENCE TO RELATED APPLICATION(S)

This application is based on and claims priority under 35 U.S.C. § 119 to Korean Patent Application No. 10-2019-0045703, filed on Apr. 18, 2019, and Korean Patent Application No. 10-2019-0111452, filed on Sep. 9, 2019, in the Korean Intellectual Property Office, the disclosures of which are incorporated by reference herein in their entireties.

BACKGROUND

1. Field

Apparatuses and methods consistent with the disclosure relate to a display device, a user terminal device, a method for controlling a display device, and a method for controlling a user terminal device, and more particularly, to a method in which a display device outputs content that is being output via a user terminal device.

2. Description of Related Art

A sound mirroring or screen mirroring technology is a technology of transmitting audio or image content output via a source device to a sync device. Mirroring technology has been used primarily to output content of a device having a relatively smaller screen size, such as a smartphone, to a device having a relatively larger screen size, such as a television (TV), and has been used for various purposes such as meetings and for everyday use.

With existing screen mirroring technology, however, users might need to perform a process of executing a screen mirroring application of a source device, and selecting a sync device that is to output content of the source device. That is, the users might need to perform multiple processes to implement the screen mirroring technology, which might prove tedious, error-prone, impractical, or the like.

Further, with existing mirroring technology, an approval process between the source device and the sync device might be required each time that mirroring is requested in order to establish a connection between the sync device and the source device to permit mirroring between the devices. Further, there is a limitation that in a case where different transmission schemes are used according to the particular content to be output, a user might be required to directly select a particular transmission scheme, or the sync device may output content having a predetermined and limited function, because the sync device may not be capable of outputting the content based on a context of the content that is being output via the source device.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a method in which a display device outputs content that is being output via a user terminal device based on an occurrence of an event requesting the content that is being output via the user terminal device being detected by the display device.

According to an aspect of the disclosure, a display device includes a communication interface configured to communicate with a user terminal device; a display; a memory configured to store at least one instruction; and a processor configured to execute the at least one instruction to: in response to detecting of a content request event associated with a request for the display device to output information associated with content that is being output via the user terminal device, receive the information associated with the content from the user terminal device via the communication interface; based on the content that is being output via the user terminal device being video content, control the display to display the video content based on information associated with the video content that is received from the user terminal device; and based on the content that is being output via the user terminal device being audio content, control the display to display an audio user interface (UI) that is different than a UI that is concurrently being displayed via the user terminal device, and control the display device to output the audio content, based on information associated with the audio content that is received from the user terminal device.

The display device includes a near field communication (NFC) interface having an NFC tag that stores information associated with the display device and connection information, wherein the content request event is an event in which the user terminal device is brought within communicative proximity of the NFC tag of the display device, and the connection information includes information associated with a connection method by which the information associated with the content that is output via the user terminal device is receivable.

The processor may receive a wake-up signal via the NFC interface and enter a standby mode in which a predetermined standby screen is displayed via the display, based on the user terminal device being brought within communicative proximity of the display device while the display device is in a powered-off state; and control the display to display the audio UI via the standby screen based on the audio content being received from the user terminal device.

The processor may control the display to display an indicator indicating that the user terminal device is within communicative proximity of the display device, on a region corresponding to a position where the user terminal device is within communicative proximity of the display device, based on entering the standby mode.

The processor may, based on the content that is being output via the user terminal device being video content, switch a mode of the display device from the standby mode to a normal mode; and control the display to display the video content and an indicator indicating that the information associated with the video content is received from the user terminal device.

The processor may based on the content that is being output via the user terminal device being video content received from an external server, receive, from the external server via the communication interface, a portion of the video content that corresponds to a current playback point of the video content that is being output via the user terminal device; and control the display to display the portion of the video content based on the information associated with the video content that includes information identifying a title of the video content, and the current playback point of the video content that is being output via the user terminal device.

The content request event may be an event in which the user terminal device is brought within communicative proximity an external device connected to the display device.

According to an aspect of the disclosure, a user terminal device includes a display; a communication interface configured to communicate with a display device; a memory configured to store at least one instruction; and a processor configured to execute the at least one instruction to: receive a signal that requests information associated with content that is being output via the user terminal device from a display device, identify a type of the content that is being output via the user terminal device; and control the communication interface to transmit, to the display device, the information associated with the content that is being output via the user terminal device by using a first communication method based on the content being video content, and by using a second communication method based on the content being audio content.

The processor may, based on the content being the audio content, control the communication interface to transmit information associated with the audio content by using the second communication method of Bluetooth communication; and based on the content being the video content, control the communicator to transmit information associated with the video content by using the first communication method of peer-to-peer (P2P) communication.

The processor may, based on receiving, from the display device, the signal that requests the information associated with the content that is being output via the user terminal device, control the display to display a user interface (UI) for selecting information associated with content to be transmitted to the display device; and based on the information associated with the content being selected via the UI, control the communication interface to transmit the selected information associated with the content to the display device.

According to an aspect of the disclosure, a method for controlling a display device may include receiving, in response to detecting a content request event associated with a request for the display device to output information associated with content that is being output via a user terminal device, the information associated with the content from the user terminal device; displaying, based on the content that is being output via the user terminal device being video content, the video content based on information associated with the video content that is received from the user terminal device; and displaying, based on the content that is being output via the user terminal device being audio content, an audio user interface (UI) that is different than a UI that is concurrently being displayed via the user terminal device, and outputting the audio content, based on information associated with the audio content that is received from the user terminal device.

The content request event may be an event in which the user terminal device is brought within communicative proximity of a near field communication (NFC) tag of the display device.

The displaying of the audio UI may include receiving a wake-up signal and entering a standby mode in which a predetermined standby screen is provided, based on the user terminal device being brought within communicative proximity of the display device while the display device is in a powered-off state; and displaying the audio UI via the standby screen based on the audio content being received from the user terminal device.

The entering of the standby mode may include displaying an indicator indicating that the user terminal device is within communicative proximity of the display device, on a region corresponding to a position where the user terminal device is within communicative proximity of the display device, based on entering the standby mode.

The displaying of the video content may include, based on the information associated with the video content being received from the user terminal device, switching a mode of the display device from the standby mode to a normal mode; and displaying the video content and an indicator indicating that the information associated with the video content is received from the user terminal device.

The displaying of the video content may include receiving, based on the content that is being output via the user terminal device being video content received from an external server, a portion of the video content corresponding to a current playback point of the video content that is being output via the user terminal device, from the external server based on information associated with the video content including information identifying a title of the video content, and the current playback point of the video content that is being output via the user terminal device.

The content request event may be an event in which the user terminal device is brought within communicative proximity of an external device connected to the display device.

According to an aspect of the disclosure, a method for controlling a user terminal device may include identifying a type of content that is being output via the user terminal device, based on receiving a signal that requests information associated with the content that is being output via the user terminal device from a display device; and transmitting, to the display device, the information associated with the content that is being output via the user terminal device using a first communication method based on the content being video content, and using a second communication method based on the content being audio content.

The transmitting may include transmitting, based on the content being the audio content, information associated with the audio content by using the second communication method of Bluetooth communication; and transmitting, based on the content being the video content, information associated with the video content by using the first communication method of peer-to-peer (P2P) communication.

The transmitting may include displaying a user interface (UI) for selecting information associated with content to be transmitted to the display device, based on receiving the signal that requests information associated with the content that is being output via the user terminal device from the display device; and transmitting, based on the information associated with the content being selected via the UI, the selected information associated with the content to the display device.

As described above, according to embodiments of the disclosure, once the display device receives the content request event, the display device outputs the content that is being concurrently output via the user terminal device, such that the user may efficiently utilize the mirroring function.

Additional and/or other aspects and advantages of the disclosure will be set forth in part in the description which follows and, in part, may be obvious from the description, or may be learned by practice of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8A is a view for describing a process in which the user terminal device is tagged to an external device connected with the display device according to an embodiment;

FIG. 16 is a flowchart for describing a method for controlling a display device according to an embodiment.

DETAILED DESCRIPTION

Figure 1A:
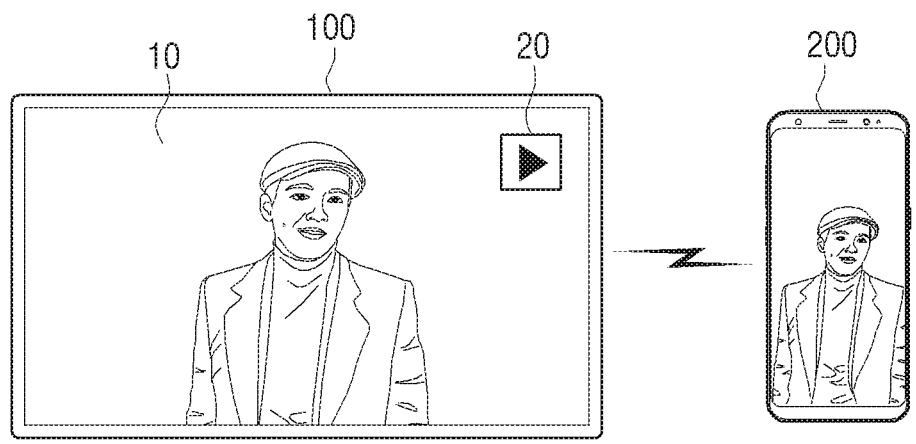
FIGS. 1A and 1B are views for describing a method for controlling a display device and a method for controlling a user terminal device according to an embodiment.

Since the disclosure may be variously modified and have several embodiments, specific embodiments of the disclosure may be illustrated in the drawings and may be described in detail in the detailed description. However, it is to be understood that technologies mentioned in the disclosure are not limited to specific embodiments, and may include all modifications, equivalents, and substitutions according to embodiments of the disclosure. Throughout the accompanying drawings, similar components may be denoted by similar reference numerals.

In addition, the following embodiments may be modified in several different forms, and the scope and spirit of the disclosure are not limited to the following embodiments. Rather, these embodiments make the disclosure thorough and complete, and are provided to completely transfer the spirit of the disclosure to those skilled in the art.

Terms used in the disclosure may be used to describe specific embodiments rather than limiting the scope of the disclosure. Singular forms of terms may include the plural forms of the terms unless the context clearly indicates otherwise.

In the disclosure, expressions such as "have," "may have," "include," "may include," or the like, may indicate the existence of a corresponding feature (e.g., a numerical value, a function, an operation, or a component such as a part), and might not exclude the existence of an additional feature.

In the disclosure, expressions such as "A or B," "at least one of A and/or B," "one or more of A and/or B," or the like, may include all possible combinations of items enumerated together. For example, "A or B," "at least one of A and B," or "at least one of A or B," may include all of: 1) a case in which at least one A is included, 2) a case in which at least one B is included, or 3) a case in which both of at least one A and at least one B are included.

Expressions such as "first," "second," or the like, used in the disclosure may indicate various components regardless of a sequence and/or importance of the components, and may be used in order to distinguish one component from the other components, and might not limit the corresponding components.

When it is mentioned that a component (e.g., a first component) is (operatively or communicatively) coupled with/to or is connected to another component (e.g., a second component), the component may be directly coupled to another component or may be coupled to another component via the other component (e.g., a third component). Moreover, when it is mentioned that any component (e.g., a first component) is "directly coupled" or "directly connected" to another component (e.g., a second component), an intermediate component (e.g., a third component) might not be present between the component and the other component.

Expressions such as "configured (or set) to" used in the disclosure may be interchangeable with expressions such as "suitable for," "having the capacity to," "designed to," "adapted to," "made to," or "capable of" depending on the context. The expression "configured (or set) to" may not necessarily mean "specifically designed to" in hardware.

Instead, the expression "a device configured to" may indicate that the device may "perform" an operation together with other devices or components. For example, a "processor configured (or set) to perform A, B, and C" may indicate a dedicated processor (e.g., an embedded processor) for performing the corresponding operations or a generic-purpose processor (e.g., a central processing unit (CPU) or an application processor) that may perform the corresponding operations by executing one or more software programs stored in a memory device.

The terms "module" or a "[function]er/or" may be configured to perform at least one function or operation, and may be implemented in hardware or software or be implemented in a combination of hardware and software. In addition, a plurality of "modules" or a plurality of "[function]ers/ors" may be integrated in at least one module and be implemented by at least one processor (not illustrated) except for a "module" or a "[function]er/or" that is implemented by specific hardware.

Hereinafter, the disclosure will be described in detail with reference to the accompanying drawings.

Figure 1B:
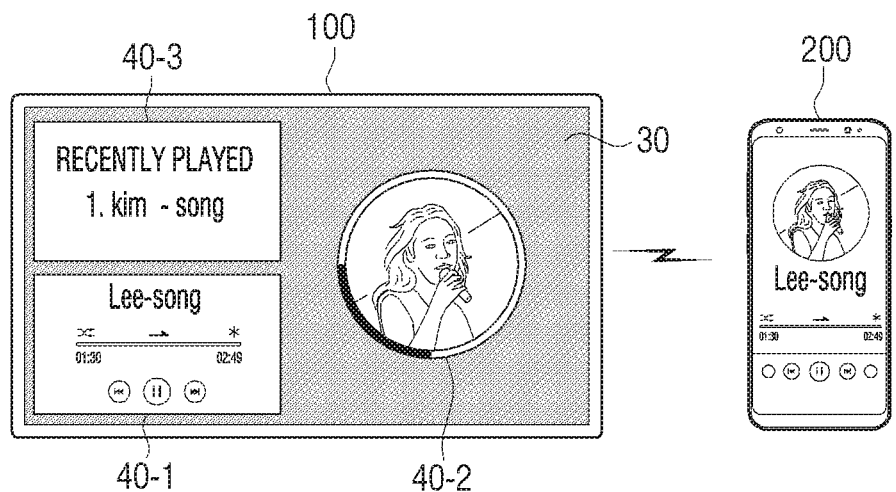

FIGS. 1A and 1B are views for describing a method for controlling a display device 100 and a method for controlling a user terminal device 200 according to an embodiment.

The user terminal device 200 according to an embodiment may include at least one of, for example, a smartphone, a tablet personal computer (PC), a video phone, a desktop PC, a laptop PC, a netbook computer, a personal digital assistant (PDA), a portable multimedia player (PMP), an MP3 player, a mobile medical device, a wearable device, or the like.

The wearable device may include at least one of an accessory type wearable device (e.g., a watch, a ring, a bracelet, an anklet, a necklace, glasses, a contact lens, or a head-mounted-device (HMD)), a textile or clothing integral type wearable device (e.g., an electronic clothing), a body attachment type wearable device (e.g., a skin pad or a tattoo), or a living body implantation type wearable device (e.g., an implantable circuit).

Although FIGS. 1A and 1B illustrate a smartphone as an example of the user terminal device 200, the disclosure is not limited thereto.

As shown in FIGS. 1A and 1B, based on detecting a content request event associated with a request for the display device 100 to output information associated with content that is being output via the user terminal device 200, the display device 100 may output the content based on the information associated with the content that is received from the user terminal device 200.

Specifically, the display device 100 may detect the content request event. According to an embodiment of the disclosure, the content request event may be an event in which the user terminal device 200 is brought within communicative proximity of a near field communication (NFC) tag including information associated with the display device 100. NFC is a short-range wireless communication protocol that may use a frequency range of 13.56 MHz. NFC permits information to be transmitted and received based on terminal devices being brought within communicative proximity (e.g., 10 centimeters). Therefore, based on the user terminal device 200 being brought within communicative proximity of the NFC tag of the display device 100, the display device 100 may transmit, to the user terminal device 200, information (e.g., a media access control (MAC) address of the display device 100) associated with the display device 100, and connection information. The connection information may include information associated with a communication method for receiving the information associated with content that is being output via the user terminal device 200. Specifically, the connection information may include information associated with a communication method by which the display device 100 may receive the information associated with content that is being output via the user terminal device 200, such as a Bluetooth MAC address or a peer-to-peer (P2P) device address. Therefore, the user terminal device 200 may connect to the display device 100 to transmit information associated with content, based on the received connection information.

According to an embodiment, the content request event may be an event in which the user terminal device 200 transmits, to the display device 100, a signal indicating that the information associated with content that is being output via the user terminal device 200 is to be transmitted. In other words, the content request event may be an event in which the user terminal device 200 transmits a signal indicating that the information associated with content that is currently being output via the user terminal device 200 is to be transmitted to the display device 100 to permit the display device to output the content while the connection is established.

According to an embodiment, the content request event may be an event in which an external device connected to the display device 100 transmits, to the user terminal device 200 that may be connected to the display device 100, a signal for requesting transmission of the information associated with content that is currently being output via the user terminal device 200. Therefore, based on receiving the signal that requests the transmission of the information associated with content from the external device, the display device 100 may transmit, to the user terminal device 200 that may be connected to the display device 100, a signal that requests the information associated with content that is currently being output via the user terminal device 200.

Further, based on detecting the content request event, the display device 100 may transmit, to the user terminal device 200, a signal that requests the information associated with content that is being o the user terminal device 200.

According to an embodiment, the user terminal device 200 may receive the signal that requests the information associated with content that is being output via the user terminal device 200 from the display device 100, while outputting the content, and the user terminal device 200 may identify a type of content that is currently being output. Further, the user terminal device 200 may transmit the information associated with content that is being output via the user terminal device 200 to the display device 100 by using various and/or different communication methods according to the identified type of content. The user terminal device 200 may utilize connection information received from the display device 100 when transmitting information associated with the identified type of content by using various and/or different communication methods. According to an embodiment, in a case where it is identified that video content is being output by the user terminal device 200, the user terminal device 200 may transmit information associated with the video content to the display device 100 by using P2P communication (e.g., Wireless Fidelity (Wi-Fi) Direct communication) by utilizing the connection information such as a P2P device MAC address. According to another embodiment, in a case where it is identified that audio content is being output via the user terminal device 200, the user terminal device 200 may transmit information associated with the audio content to the display device 100 by using Bluetooth communication and utilizing the connection information such as a Bluetooth MAC address. In a case where the user terminal device 200 is brought within communicative proximity of the display device 100 when the display device 100 is in a powered-off state, the display device 100 may receive a wake-up signal from the user terminal device 200 and enter a standby mode in which a predetermined standby screen 30 is provided. According to an embodiment, the display device 100 may display an indicator indicating that the user terminal device 200 is within communicative proximity of the display device 100 on a region of the standby screen 30, and the region may correspond to a position where the user terminal device 200 is within communicative proximity. A detailed description thereof will be provided below in more detail with reference to FIG. 5B.

Further, as shown in FIG. 1A, in a case where content that is being output via the user terminal device 200 is video content, the display device 100 may be switched from the standby mode to a normal mode, and display the video content and an indicator 20 indicating that information associated with video content is received, based on the information (e.g., orientation information of the video content, a title of the video content, information associated with a current playback point of the video content that is being output via the user terminal device, and a connection method for receiving the video content) associated with the video content. The indicator 20 indicating that information associated with video content is received is shown as a play button in FIG. 1A. However, the indicator 20 may be variously implemented in a form such as a thumbnail icon of the video content, or the like.

Further, as shown in FIG. 1B, in a case where content that is being output via the user terminal device 200 is audio content, the display device 100 may display audio user interfaces (UIs) 40-1, 40-2, and 40-3 that are different than a UI that is concurrently being displayed via the user terminal device 200, while outputting the received audio content. According to an embodiment, the display device 100 may receive information (e.g., an audio data packet, a title of the audio content, a playlist, a playback point, and the like) associated with audio content from the user terminal device 200. The display device 100 may output the audio content based on the received audio data packet. Further, the display device 100 may display the audio UI 40-1, the audio UI 40-2, and the audio UI 40-3 on the standby screen 30. The audio UI 40-1 may be generated based on the title of the audio content, the playback point, and the like, the audio UI 40-2 may be generated based on an image (e.g., an album image of audio data) relevant to the audio content that is being played, the playback point, and the like, and the audio UI 40-3 may be generated based on a play history of recently played audio content. As such, the display device 100 may output the audio content while displaying, on the standby screen 30, the audio UIs 40-1, 40-2, and 40-3 that are different than the UI that is concurrently displayed on the user terminal device 200.

The content request event may be an event in which the user terminal device 200 is brought within communicative proximity of an external device connected to the display device 100. That is, the display device 100 may output content that is being output via the user terminal device 200 based on the user terminal device 200 being brought within communicative proximity of the external device (e.g., a remote controller controlling the display device 100, and an artificial intelligence (AI) speaker connected to the display device 100) connected to the display device 100, rather than being directly brought within communicative proximity of the NFC tag of the display device 100. A detailed description thereof will be provided below in more detail with reference to FIGS. 8A, and 9 to 11.

Figure 2A:
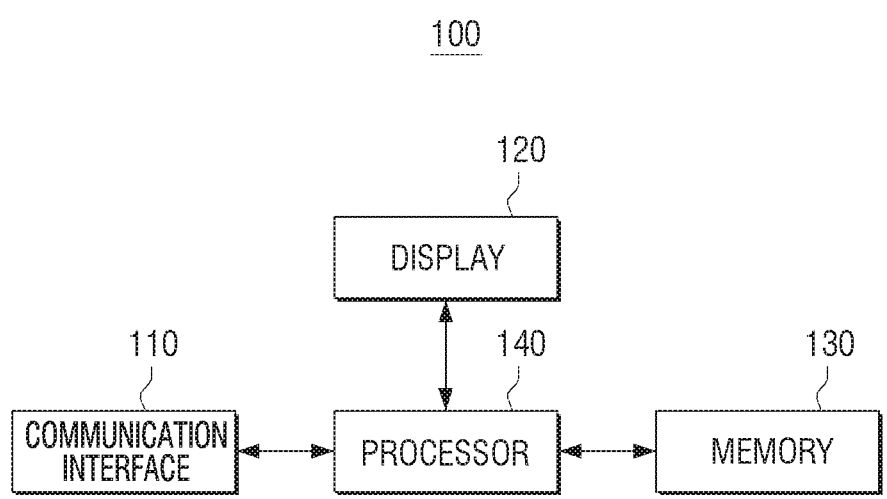
FIG. 2A is a block diagram schematically illustrating a configuration of the display device according to an embodiment.

FIG. 2A is a block diagram schematically illustrating a configuration of the display device 100 according to an embodiment.

As illustrated in FIG. 2, the display device 100 may include a communication interface 110, a display 120, a memory 130, and a processor 140.

The communication interface 110 may be configured to communicate with the user terminal device 200 by various methods. The communication between the communication interface 110 and the user terminal device 200 may be facilitated via a connection via a third device (e.g., a relay, a hub, an access point, a server, a gateway, or the like).

The communication interface 110 may include various communication modules to connect to the user terminal device 200. A detailed description of the various communication modules is provided below with reference to FIG. 2B.

The display 120 may display various information based on a control by the processor 140. Specifically, based on a wake-up signal being received via the communication interface 110, the display 120 may display a predetermined standby screen based on the control by the processor 140. Further, the display 120 may display, on a region of the standby screen, an indicator indicating that the user terminal device 200 is within communicative proximity of the display device 100, and the region may correspond to a position where the user terminal device 200 is within communicative proximity, according to a control by the processor 140.

According to an embodiment, the display 120 may display video content received from the user terminal device 200 based on a control by the processor 140. Further, the display 120 may display an audio UI that is different than a UI that is concurrently being displayed via the user terminal device 200 based on a control by the processor 140.

Further, the display 120 may be implemented by a touch screen in combination with a touch panel, or may be implemented in various forms.

Further, a panel of the display 120 may be implemented by various display technologies such as a liquid crystal display (LCD) technology, an organic light emitting diode (OLED) technology, an active-matrix organic light emitting diode (AM-OLED) technology, a liquid crystal on silicon (LcoS) technology, a quantum dot light emitting diode (QLED) technology, and a digital light processing (DLP) technology. Further, the display 120 may be in a form of a flexible display and may be connected in at least one of a front surface region, a side surface region, or a back surface region of the display device 100.

The memory 130 may store instructions or data that may be utilized by at least another component of the display device 100. In particular, the memory 130 may be implemented by a non-volatile memory, a volatile memory, a flash memory, a hard disk drive (HDD), a solid state drive (SDD), or the like. The memory 130 is accessed by the processor 140, and various operations such as readout, recording, correction, deletion, update, and the like, of data in the memory 130 may be performed by the processor 140. In the disclosure, the term "memory" includes the memory 130, a read only memory (ROM) (not illustrated) in the processor 140, a random access memory (RAM) (not illustrated), or a memory card (not illustrated) (e.g., a micro secure digital (SD) card or a memory stick) mounted in the display device 100. Further, the memory 130 may store a program, data, or the like, for configuring various screens to be displayed on a display region of the display 120.

Further, the memory 130 may store information associated with the user terminal device 200, and information associated with content that is received from the user terminal device 200. For example, the memory 130 may store information associated with the user terminal device 200, such as an Internet protocol (IP) address of the user terminal device 200, a network environment, security settings, and connection history. Further, the memory 130 may store a title, a type, a history, and the like, of the content received form the user terminal device 200.

The processor 140 may be electrically connected to the memory 130 to control the overall operation and function of the display device 100. In particular, based on detecting the content request event, the processor 140 may control the communication interface 110 to transmit, to the user terminal device 200, a signal that requests the information associated with content that is being output via the user terminal device 200. According to an embodiment, and in a case where the content request event is an event in which the user terminal device 200 is brought within communicative proximity of the NFC tag of the display device 100, the processor 140 may receive the wake-up signal via an NFC communication interface 150 and enter the standby mode in which the predetermined standby screen is provided. After entering the standby mode, the processor 140 may control the display 120 to display, on the region corresponding to a position where the user terminal device 200 is within communicative proximity, the indicator indicating that the user terminal device 200 is within communicative proximity. According to an embodiment, and in a case where the user terminal device 200 is brought within communicative proximity of the right side of the display device 100, the processor 140 may control the display 120 to display the indicator indicating that the user terminal device 200 is within communicative proximity, on a right side region of the display 120.

In a case where information associated with video content is received from the user terminal device 200, the processor 140 may switch a mode of the display device 100 from the standby mode to the normal mode. Then, the processor 140 may control the display 120 to display the video content and the indicator indicating that the information associated with the video content was received, based on the information associated with the video content that is received from the user terminal device 200, in the normal mode. The indicator indicating that the information regarding the video content was received may be an indicator having a play button shape as shown in FIG. 1A. Alternatively, the indicator indicating that the information regarding the video content was received may also be a thumbnail icon of the received video content.

Further, in a case where information associated with audio content is received from the user terminal device 200, the processor 140 may control an audio output component 170 to output the audio content based on the information associated with the audio content, and may control the display 120 to display, on the standby screen, an audio UI that is different from a UI that is concurrently being displayed on the user terminal device 200. Specifically, the processor 140 may identify an audio UI based on information (e.g., a title of the audio content, a playback point, a playlist, or the like) associated with audio content that is received from the user terminal device 200, and control the display 120 to display the identified audio UI.

Meanwhile, in a case where the content that is being output via the user terminal device 200 is video content received from an external server 700, the processor 140 may receive information associated with the video content from the user terminal device 200 via the communication interface 110. The information associated with the video content may include a title of the video content that is being output via the user terminal device 200, and a current playback point of the video content that is being output via the user terminal device 200. Then, the processor 140 may receive, from the external server 700 via the communication interface 110, video content that corresponds to a timeframe after the playback point of the video content that is being output via the user terminal device 200, based on the information associated with the video content.

The processor 140 may store information (e.g., an IP address of the user terminal device 200, a network environment, security settings, and user information of the user terminal device 200) associated with the user terminal device 200 that is received from the user terminal device 200, a type and a history of content received from the user terminal device 200, in the memory 130. Further, the processor 140 may control the display 120 to display the indicator indicating that the user terminal device 200 is within communicative proximity, based on the stored information associated with the user terminal device 200. Further, the processor 140 may control the display 120 to display a UI including the stored type and history of content received from the user terminal device 200 on the standby screen or a screen in the normal mode.

Figure 2B:
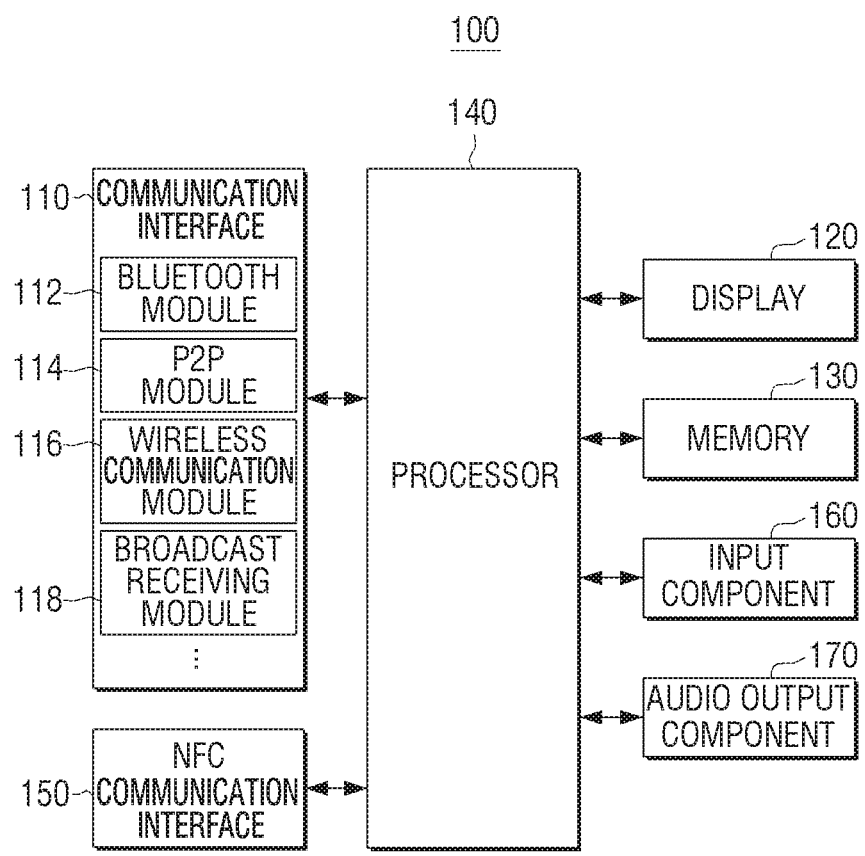
FIG. 2B is a block diagram illustrating a configuration of the display device according to an embodiment.

FIG. 2B is a block diagram illustrating a configuration of the display device 100 according to an embodiment. As illustrated in FIG. 2B, the display device 100 may include to communication interface 110, a display 120, a memory 130, a processor 140, an NFC communication interface 150, an input component 160, and an audio output component 170. The communication interface 110, the display 120, the memory 130, and the processor 140 shown in FIG. 2B may be substantially similar to the communication interface 110, the display 120, the memory 130, and the processor 140 as described above with reference to FIG. 2A.

The communication interface 110 may include various modules configured to connect to the user terminal device 200 or the external server 700. For example, the communication interface 110 may include a Bluetooth module 112, a P2P module 114, a wireless communication module 116, and a broadcast receiving module 118.

The Bluetooth module 112 may be a module that is configured to connect to the user terminal device 200 using a Bluetooth low energy (BLE) protocol. Bluetooth is a wireless communication method using an industrial, scientific, and medical (ISM) frequency range (e.g., 2402 to 2480 MHz). According to an embodiment, the Bluetooth module 112 may receive, from the user terminal device 200, information associated with audio content output via the user terminal device 200 by using Bluetooth communication.

The P2P module 114 may be a module that is configured to connect to the user terminal device 200 by using P2P communication. According to an embodiment, the P2P module 114 may connect to the user terminal device 200 by utilizing Wi-Fi Direct, which is a Wi-Fi-based P2P standard, without requiring access to separate equipment such as an access point (AP) or a router. Further, the P2P module 114 may receive, form the user terminal device 200, information associated with video content that is being output via the user terminal device 200.

The wireless communication module 116 may include a cellular communication module using at least one of long-term evolution (LTE), LTE Advanced (LTE-A), code division multiple access (CDMA), wideband CDMA (WCDMA), universal mobile telecommunications system (UMTS), Wireless Broadband (WiBro), or Global System for Mobile Communications (GSM). As another example, the wireless communication module may include, for example, at least one of Zigbee, magnetic secure transmission, radio frequency (RF), or a body area network (BAN).

The broadcasting receiving module 118 may include a terrestrial broadcasting receiving module (not illustrated) including an antenna, a demodulator, an equalizer, and the like, for receiving a terrestrial broadcasting signal, a digital multimedia broadcasting (DMB) module for receiving and processing a DMB broadcasting signal, or the like.

The NFC communication interface 150 may include an NFC tag in which information (e.g., a MAC address of the display device 100) associated with the display device 100, and connection information (e.g., a Bluetooth MAC address, a P2P device MAC address, and the like) are stored. The NFC tag may include an integrated circuit (IC) and an antenna coil. When the user terminal device 200 including an NFC reader is brought within communicative proximity of the NFC tag to perform short distance access, the NFC tag is driven by an electromagnetic wave emitted from the NFC reader, and may transmit, to the user terminal device 200, an RF signal including information associated with the display device 100 and connection information that is stored in the NFC tag.

Specifically, in the antenna coil in the NFC tag, a current may be induced based on the electromagnetic wave emitted from the NFC reader. The induced current may be charged to a capacitor included in the NFC tag. Further, the antenna coil in the NFC tag may be formed by a conductor wound multiple times in a rectangular or circular form. The IC may be driven by the current charged to the capacitor to modulate and encode information recorded in a memory in the IC to generate the RF signal.

Further, the NFC communication interface 150 may receive the wake-up signal from the user terminal device 200. The wake-up signal may be a signal for inducing the display device 100 to enter the standby mode in which the predetermined standby screen is provided, even in a state in which the display device 100 is powered off.

The input component 160 may receive a user input for controlling the display device 100. Particularly, the input component 160 may include, for example, a touch panel for receiving a touch gesture, a stylus pen, or the like, and a button for receiving a manipulation by the user. In addition, the input component 160 may be implemented by another input device (e.g., a remote controller 800, a virtual keyboard, a mouse, a motion input component, or the like).

The audio output component 170 may be a component configured to output various alarms or audio messages as well as various audio data on which various processes such as decoding, amplification, noise filtering, and the like, are performed by an audio processor (not illustrated). Particularly, the audio output component 170 may output a response to user speech as an audio message in a form of a natural language. The audio output component 170 may be implemented by a speaker, or by an output terminal that may output audio data.

Particularly, according to an embodiment, the audio output component 170 may output audio content received from the user terminal device 200 based on a control by the processor 140.

The processor 140 may include one or more of a central processing unit (CPU) configured to process a digital signal, a microcontroller unit (MCU), a micro processing unit (MPU), a controller, an application processor (AP), a communication processor (CP), an ARM processor, or the like. In addition, the processor 140 may be implemented by a system-on-chip (SoC) or a large scale integration (LSI) in which a processing algorithm is embedded, or may be implemented in a field programmable gate array (FPGA) form. The processor 140 may perform various functions by executing computer executable instructions stored in the memory 130. In addition, the processor 140 may include at least one of a graphics processing unit (GPU), a neural processing unit (NPU), or a visual processing unit (VPU) as a separate artificial intelligence (AI) dedicated processor configured to perform an AI function.

Figure 3:
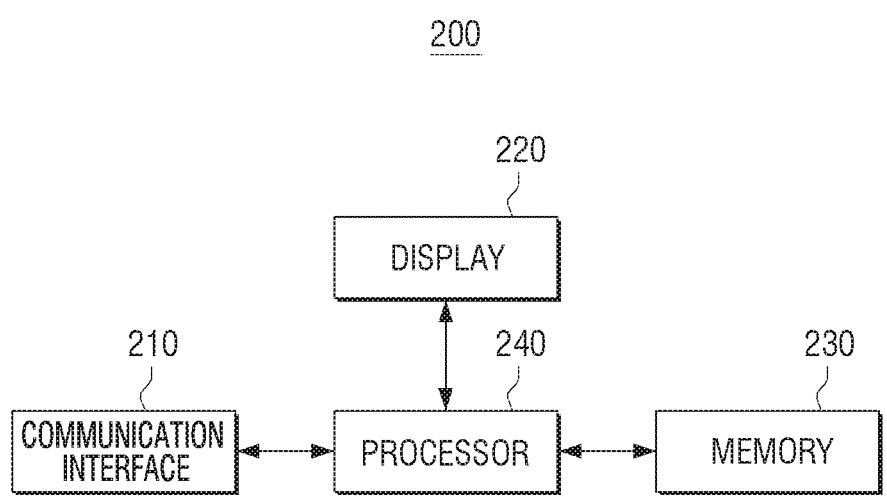
FIG. 3 is a block diagram schematically illustrating a configuration of the user terminal device according to an embodiment.

FIG. 3 is a block diagram schematically illustrating a configuration of the user terminal device 200 according to an embodiment of the disclosure.

As shown in FIG. 3, the user terminal device 200 according to an embodiment may include a communication interface 210, a display 220, a memory 230, and a processor 240.

The communication interface 210 may be configured to communicate with the display device 100, and the external device 800 connected with the display device 100. Specifically, the communication interface 210 may include an NFC module, and the NFC module may be implemented by an NFC reader. When the user terminal device 200 including the NFC reader is brought within communicative proximity of the NFC tag in which information regarding the display device 100 is stored to perform short distance access, an electromagnetic wave may be emitted from the NFC reader. Further, the NFC tag of the display device 100 is driven by the emitted electromagnetic wave and may transmit an RF signal including the information regarding the display device 100 to the NFC reader. In this way, the communication interface 210 may receive the information associated with the display device 100 and connection information from the display device 100. The connection information may include information associated with a communication method by which the display device 100 may receive the information associated with the content that is being output via the user terminal device 200, such as a Bluetooth MAC address or a peer-to-peer (P2P) device address.

Further, the communication interface 210 may include at least one of a Wi-Fi chip, a Bluetooth chip, a P2P chip, or a wireless communication chip. Specifically, the Wi-Fi chip, the Bluetooth chip, and the P2P chip may perform Wi-Fi communication, Bluetooth communication, and P2P communication, respectively. Further, the wireless communication chip may be a chip configured to perform communication according to various communication protocols such as Institute of Electrical and Electronics Engineers (IEEE), Zigbee, 3rd generation (3G), 3rd generation partnership project (3GPP), long term evolution (LTE), 5th generation (5G), and the like. Particularly, the communication interface 210 may transmit information associated with audio content to the display device 100 by using Bluetooth communication, and transmit information associated with video content to the display device 100 by using P2P communication. Alternatively, the communication interface 210 may transmit content by using various communication methods.

The display 220 may display various information based on a control by the processor 240. Specifically, based on receiving a signal for requesting information associated with content that is currently being output via the user terminal device 200 from the display device 100, the display 220 may display a UI for selecting information associated with content to be transmitted to the display device 100 according to a control by the processor 240.

Further, the display 220 may be implemented by a touch screen in combination with a touch panel. Further, a panel of the display 220 may be implemented by various display technologies such as a liquid crystal display (LCD) technology, an organic light emitting diode (OLED) technology, an active-matrix organic light emitting diode (AM-OLED) technology, a liquid crystal on silicon (LcoS) technology, a quantum dot light emitting diode (QLED) technology, and a digital light processing (DLP) technology. Further, the display 220 may be in a form of a flexible display and may be connected in at least one of a front surface region, a side surface region, or a back surface region of the user terminal device 200.

The memory 230 may include at least one instruction related to the user terminal device 200. The memory 230 may include a semiconductor memory such as a flash memory, or a magnetic storage medium such as a hard disk, or the like. Further, the memory 230 may store various kinds of information such as various kinds of data input, set, or generated during execution of the programs or the applications therein.

In addition, the memory 230 may include various software modules for operating the user terminal device 200 according to various embodiments, and the processor 240 may execute the various software modules stored in the memory 230 to perform an operation of the user terminal device 200 according to various embodiments.

Further, the memory 230 may store the information associated with the display device 100 and connection information.

The processor 240 may be electrically connected to the memory 230 to control overall operation and function of the user terminal device 200. The processor 240 may be implemented in various forms. For example, the processor 240 may be implemented by at least one of an application specific integrated circuit (ASIC), an embedded processor, a microprocessor, a hardware control logic, a hardware finite state machine (FSM), or a digital signal processor (DSP).

In particular, according to an embodiment, based on receiving the content request signal from the display device 100, the processor 240 may identify a type of the content that is currently being output via the user terminal device 200. Specifically, the processor 240 may analyze metadata of content that is being output, or the like to identify the type of content. Further, the processor 240 may control the communication interface 210 to transmit information associated with the content that is being output via the user terminal device 200 to the display device 100 by using different communication methods according to the identified type of content.

According to an embodiment, in a case where the content that is being currently output is identified as audio content, the processor 240 may control the communication interface 210 to transmit, to the display device 100, information associated with the audio content that is being output by using Bluetooth communication. Further, in a case where the content that is being currently output is identified as video content, the processor 240 may control the communication interface 210 to transmit, to the display device 100, information associated with the video content that is being output by using P2P communication.

Meanwhile, based on receiving the content request signal f from the display device 100, the processor 240 may control the display 220 to display the UI for selecting information associated with the content to be transmitted to the display device 100. Further, based on receiving a selection of information associated with the content via the UI for selecting the information associated with the content to be transmitted to the display device 100, the processor 240 may control the communication interface 210 to transmit information associated with the selected content to the display device 100. According to an embodiment, and in a case where information associated with audio data is selected for transmission, the processor 240 may control the communication interface 210 to transmit the information associated with the audio data to the display device 100 by using Bluetooth communication. In a case where information regarding video data is selected for transmission, the processor 240 may control the communication interface 210 to transmit the information associated with the video data to the display device 100 by using P2P communication.

Figure 4:
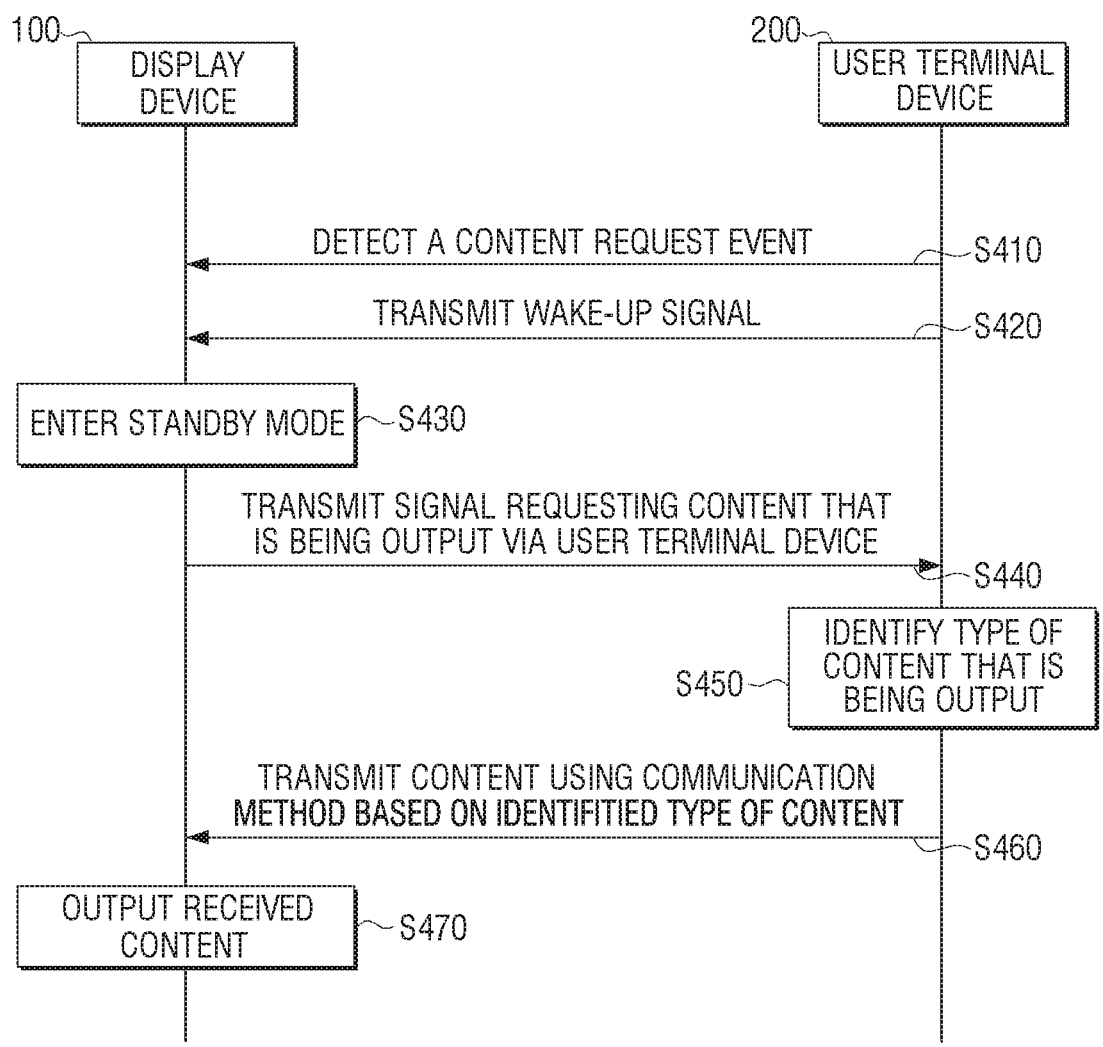
FIG. 4 is a sequence diagram illustrating a process in which the display device outputs content that is being output via the user terminal device according to an embodiment.

FIG. 4 is a sequence diagram illustrating a process in which the display device outputs content that is being output via the user terminal device, according to an embodiment.

First, the display device 100 may detect a content request event associated with a request for the display device 100 to output information associated with content that is being output via the user terminal device 200 (S410). According to an embodiment, the content request event may be an event in which the user terminal device 200 is brought within communicative proximity of the NFC tag including information (e.g., a MAC address of the display device) and connection information. Based on the user terminal device 200 being brought within communicative proximity of the NFC tag, the user terminal device 200 may receive the information associated with the display device 100 that is stored in the NFC tag, and transmit the wake-up signal to the display device 100 (S420). Based on receiving the wake-up signal, the display device 100 may enter the standby mode in which the predetermined standby screen is provided, even when the display device 100 is powered off (S430). Specifically, based on entering the standby mode, the display device 100 may display, on a region corresponding to a position where the user terminal device 200 is within communicative proximity, the indicator indicating that the user terminal device is within communicative proximity.

The display device 100 may transmit, to the user terminal device 200, the signal for requesting information associated with content that is being output via the user terminal device 200 (S440). Based on receiving the signal for requesting information associated with content that is being output via the user terminal device 200, the user terminal device 200 may identify a type of the content that is being output (S450). Specifically, the user terminal device 200 may analyze metadata of the content that is being output to identify whether the type of content is audio data or video data.

Further, the user terminal device 200 may transmit the information associated with the content by using different communication methods based on the identified type of content (S460). Specifically, the user terminal device 200 may utilize connection information received from the display device 100 when transmitting the information associated with the content by using the different communication methods. According to an embodiment, and in a case where the content is identified as audio content, the user terminal device 200 may transmit information associated with the audio content to the display device 100 by using Bluetooth communication. Further, and in a case where the content is identified as video content, the user terminal device 200 may transmit information regarding the video content to the display device 100 by using P2P communication.

The display device 100 may output the content in a manner according to the type of content, based on the received information regarding the content (S470). Specifically, in a case where the content that is being output via the user terminal device 200 is audio content, the display device 100 may display an audio UI that is different than a UI that is concurrently being displayed on the user terminal device 200 while outputting the audio content, based on received information associated with the audio content. alternatively, and in a case where the content that is being output via the user terminal device 200 is video content, the display device 100 may be switched from the standby mode to the normal mode, and display the video content and the indicator indicating that information associated with the video content is received, based on the received information associated with the video content.

Figure 5A:
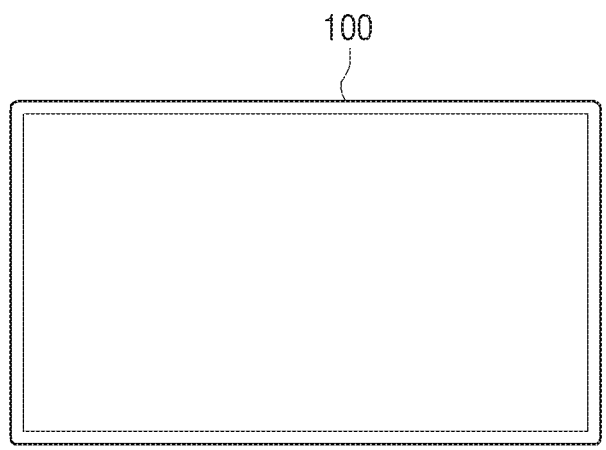
FIG. 5A is a view for describing the powered-off display device according to an embodiment.
Figure 5B:
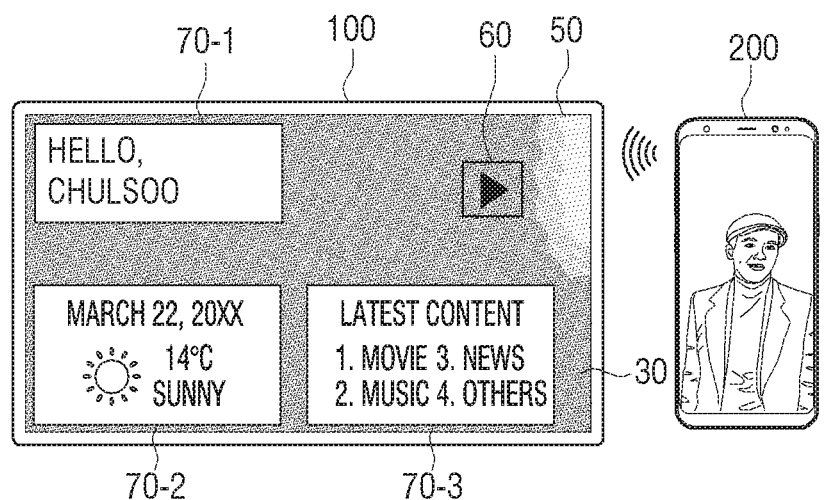
FIG. 5B is a view for describing a process in which the user terminal device on which video content is being output is tagged to the powered-off display device according to an embodiment.
Figure 5C:
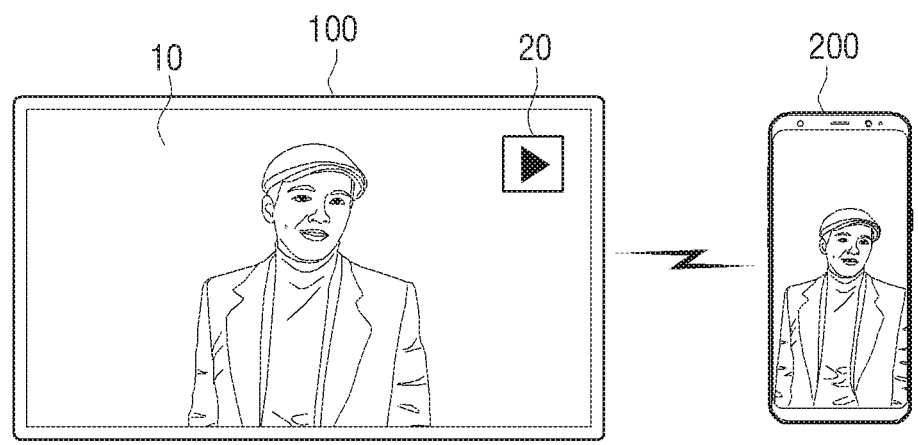
FIG. 5C is a view for describing a process in which the display device displays video content received from the user terminal device according to an embodiment.

FIGS. 5A to 5C are views for describing a process in which the display device 100 receives information associated with video content from the user terminal device 200, and outputs content based on the received information according to an embodiment.

As shown in FIG. 5A, the display device 100 may be in a powered-off state. A function to be described later may be performed even in a state in which the display device 100 is powered off.

As shown in FIG. 5B, based on the user terminal device 200 being brought within communicative proximity of the powered-off display device 100, the display device 100 may receive the wake-up signal from the user terminal device 200 and enter the standby mode in which the predetermined standby screen 30 is provided.

Specifically, the display device 100 may display, on a region of the standby screen 30, indicators 50 and 60 indicating that the user terminal device 200 is within communicative proximity of the display device 100. The region may correspond to a position where the user terminal device 200 is within communicative proximity. According to an embodiment, and as shown in FIG. 5B, in a case where the user terminal device 200 is within communicative proximity of the display device 100 at the right-upper side of the display device 100, the display device 100 may display the indicator 50 indicating that the user terminal device 200 is within communicative proximity, on a right-upper side region of the display 120. In FIG. 5B, the indicator 50 indicating that the user terminal device 200 is within communicative proximity on the right-upper side region of the display 120 is implemented in a form in which water spreads, but this is merely an embodiment, and the indicator 50 may be implemented in various forms. As video content is being output via the user terminal device 200, the display device 100 may display the indicator 60 indicating video content on the right-upper region of the display 120. Although the indicator 60 indicating video content is implemented by a play button in FIG. 5B, the indicator 60 may be a thumbnail icon of video content to be received from the user terminal device 200, or may be a title of the received image content. That is, the indicators 50 and 60 illustrated in FIG. 5B, which indicate that the user terminal device 200 is within communicative proximity, are merely an embodiment, and the indicators 50 and 60 indicating that the user terminal device 200 is within communicative proximity may be implemented in various forms.

Further, base on the user terminal device 200 being brought within communicative proximity of the display device 100, the display device 100 may receive information (e.g., an IP address, received content history, user information, security settings, a network environment, and the like, of the user terminal device 200) associated with the user terminal device 200. Therefore, the display device 100 may display, on the standby screen 30, a UI 70-1 indicating that the user terminal device 200 is within communicative proximity, based on the received information. For example, in a case where information indicating that a name of a user of the user terminal device 200 is "Chulsoo" is received from the user terminal device 200, the display device 100 may display, on the standby screen 30, the UI 70-1 that displays a phrase "Hello, Chulsoo." Further, the display device 100 may display, on the standby screen 30, a UI 70-2 that displays weather and calendar information or a UI 70-3 that displays latest content information, but this is merely an embodiment, and the display device 100 may display a UI displaying various types of information.

Based on the user terminal device 200 being brought within communicative proximity of the display device 100, the display device 100 may transmit, to the user terminal device 200, a signal that requests the user terminal device 200 for information associated with content. As shown in FIG. 5B, based on receiving the signal that requests information associated with content from the display device 100, the user terminal device 200 may identify that video content is being output, and transmit information associated with the video content to the display device 100 by using P2P communication.

Further, as shown in FIG. 5C, in a case where content that is being output via the user terminal device 200 is video content, the display device 100 may be switched from the standby mode to the normal mode, and display video content 10, and the indicator 20 indicating that video content is received, based on the information associated with the video content that is received from the user terminal device 200. According to an embodiment, the display device 100 may display the indicator 20 indicating that video content is received for a predetermined time frame and then remove the indicator 20.

Figure 6A:
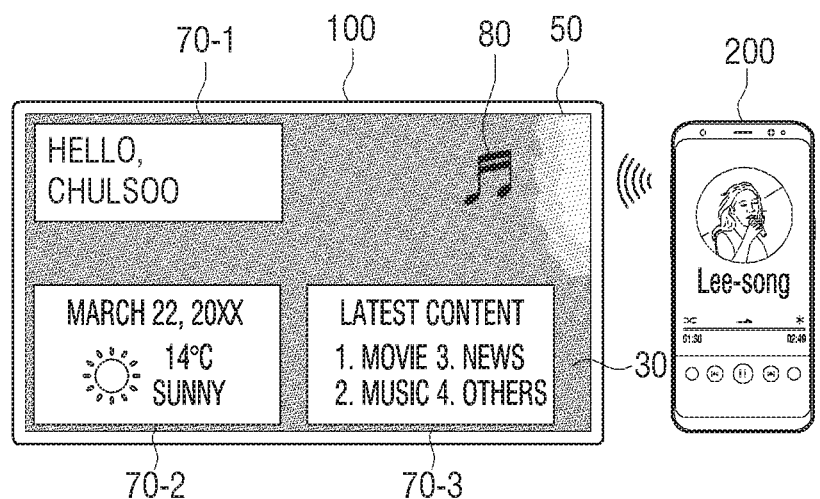
FIG. 6A is a view for describing a process in which the user terminal device via which audio content is being output is tagged to the display device according to an embodiment.
Figure 6B:
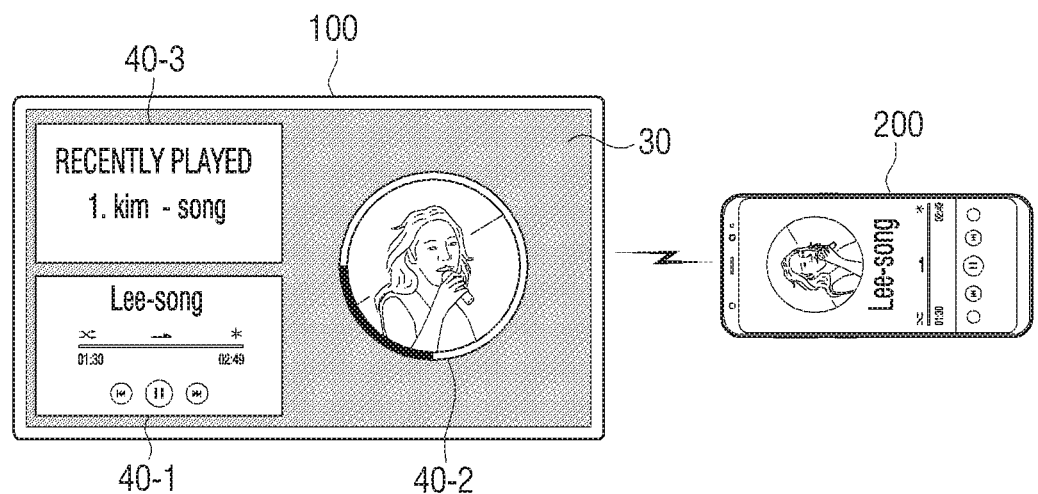
FIG. 6B is a view for describing a process in which the display device outputs audio content received from the user terminal device according to an embodiment.

FIGS. 6A and 6B are views for describing a process in which the display device 100 receives information associated with audio content from the user terminal device 200, and outputs the audio content based on the received information associated with the audio content, according to an embodiment.

FIGS. 6A and 6B illustrate a similar situation as that shown in FIGS. 5A to 5C except that audio content is output instead of video content.

As illustrated in FIG. 6A, the display device 100 may display indicators 50 and 80 indicating that the user terminal device 200 is within communicative proximity, on a region of the standby screen 30. The region may correspond to a position where the user terminal device 200 is within communicative proximity. In contrast to FIG. 5B, the user terminal device 200 outputs audio content, and thus the indicator 80 indicating that the user terminal device 200 is within communicative proximity may have a musical note shape corresponding to audio content. It should be understood that this is merely an embodiment, and the indicator 80 indicating that the user terminal device 200 is within communicative proximity may be implemented in various forms. Further, as shown in FIG. 6A, based on receiving the signal that requests information associated with content that is being output via the user terminal device 200 from the display device 100, the user terminal device 200 may identify that audio content is being output, and transmit information associated with the audio content to the display device 100 by using Bluetooth communication.

As shown in FIG. 6B, based on receiving the information associated with the audio content from the user terminal device 200, the display device 100 may display, on the standby screen 30, the audio UIs 40-1, 40-2, and 40-3 that are different than a UI that is being concurrently displayed via the user terminal device 200, and output the audio content based on the received information associated with the audio content. Further, the display device 100 may display, on the standby screen 30, the audio UIs 40-1, 40-2, and 40-3 that are generated based on the received information (e.g., a title of the audio content, image information related to the audio content, a play history, a playback point, and a playlist) associated with the audio content that is received from the user terminal device 200. Specifically, the display device 100 may display the audio UI 40-1, the audio UI 40-2, and the audio UI 40-3 on the standby screen 30. The audio UI 40-1 may be generated based on information associated with the title of the audio content and the playback point, the audio UI 40-2 may be generated based on information regarding an image relevant to the received audio content, and the playback point, and the audio UI 40-3 may be generated based on received information associated with the play history. However, this is merely an embodiment, and the display device 100 may display, on the standby screen 30, various UIs generated based on information regarding an audio content.

Figure 7:
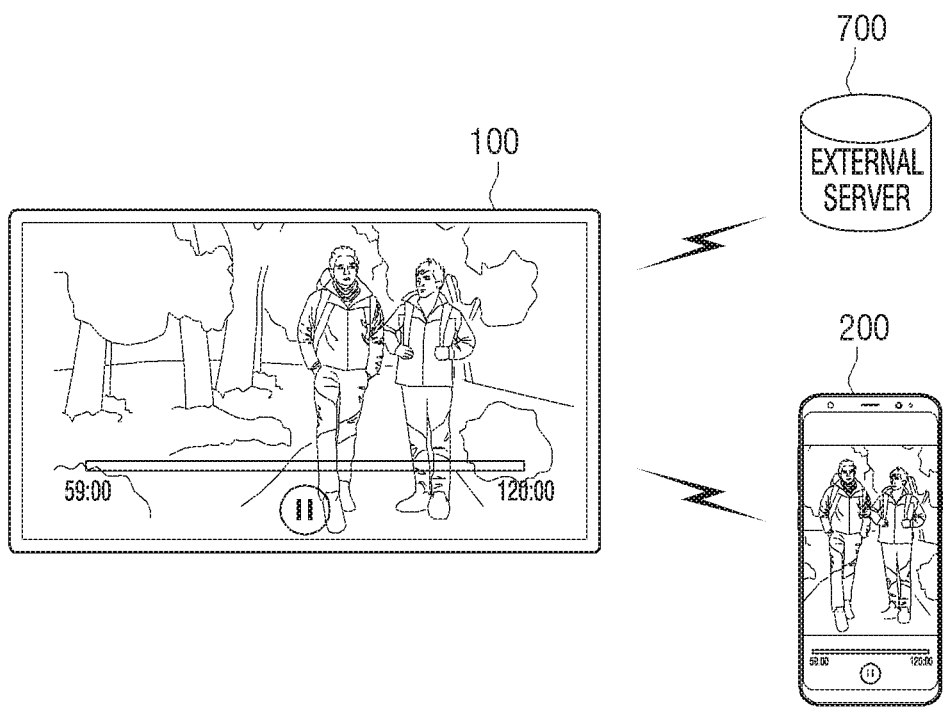
FIG. 7 is a view for describing a process in which the display device receives content from an external server and the user terminal device according to an embodiment.

FIG. 7 is a view for describing a process in which the display device 100 receives information associated with content from the external server 700 and the user terminal device 200 according to an embodiment.

As shown in FIG. 7, and in a case where video content that is being output via the user terminal device 200 is video content received from the external server 700, the display device 100 may receive information associated with the video content from the user terminal device 200. The information may include a title and a current playback point of the video content that is currently being output via the user terminal device 200. According to an embodiment, and as shown in FIG. 7, the display device 100 may receive, from the user terminal device 200, information indicating that a title of the video content that is being output via the user terminal device 200 is "hiking," and information identifying that a current playback point of the video content is 59 minutes. Then, the display device 100 may receive, from the external server 700 from which the user terminal device 200 also receives the video content, a portion of the video content that corresponds to the current playback point of the video content that is being output via the user terminal device 200, based on the received information. According to an embodiment, the display device 100 may receive, from the external server 700, video content titled "hiking" after the playback point of 59 minutes. Therefore, the display device 100 may receive and display the video content that corresponds to the current playback point of the video content that is received from the external server 700 and is being output via the user terminal device 200.

Figure 8B:
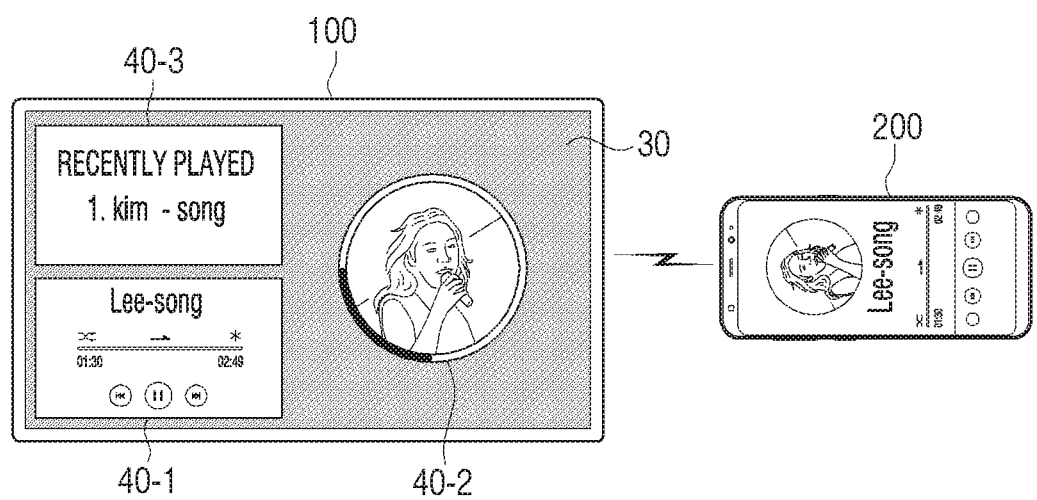
FIG. 8B is a view for describing a process in which the display device outputs audio content received from the user terminal device according to an embodiment.

FIGS. 8A and 8B are views for describing a process in which the user terminal device 200 is brought within communicative proximity of the external device 800 connected to the display device 100, according to an embodiment. In FIG. 8A, the external device 800 is implemented by a remote controller, but this is merely an embodiment, and the external device 800 may be implemented by various devices such as an AI speaker. According to an embodiment, the external device 800 may include an NFC tag in which information (e.g., a MAC address of the display device 100) associated with the display device 100 and connection information are stored.

According to an embodiment, based on the display device 100 being in a powered-off state, and based on the user terminal device 200 being brought within communicative proximity of the external device 800 connected to the display device 100, the user terminal device 200 or the external device 800 may transmit the wake-up signal to the display device 100. Based on the wake-up signal being received, the display device 100 may enter the standby mode in which the predetermined standby screen 30 is provided. Specifically, the display device 100 may display, on the standby screen 30, the indicator 80 indicating that the user terminal device 200 is within communicative proximity of the external device 800, the UI 70-1 including information associated with the user terminal device 200 that is received from the user terminal device 200, and the UIs 70-2 and 70-3 indicating weather and calendar information and latest content, respectively. However, this is merely an embodiment, and the display device 100 may display a UI including various types of information, on the standby screen 30.

Further, the display device 100 may transmit, to the user terminal device 200, the signal that requests information associated with content that is being output via the user terminal device 200. That is, as similar to the case where the user terminal device 200 is directly brought within communicative proximity of the display device 100, the display device 100 may transmit the signal that requests information associated with content that is being output via the user terminal device 200 even in a case where the user terminal device 200 is within communicative proximity of the external device 800 connected to the display device 100.

In FIG. 8B, the user terminal device 200 outputs audio content, and thus the user terminal device 200 may transmit information associated with the audio content to the display device 100 by using Bluetooth communication. A subsequent process has been described above with reference to FIG. 6B, and thus a redundant description may be omitted.

Figure 9:
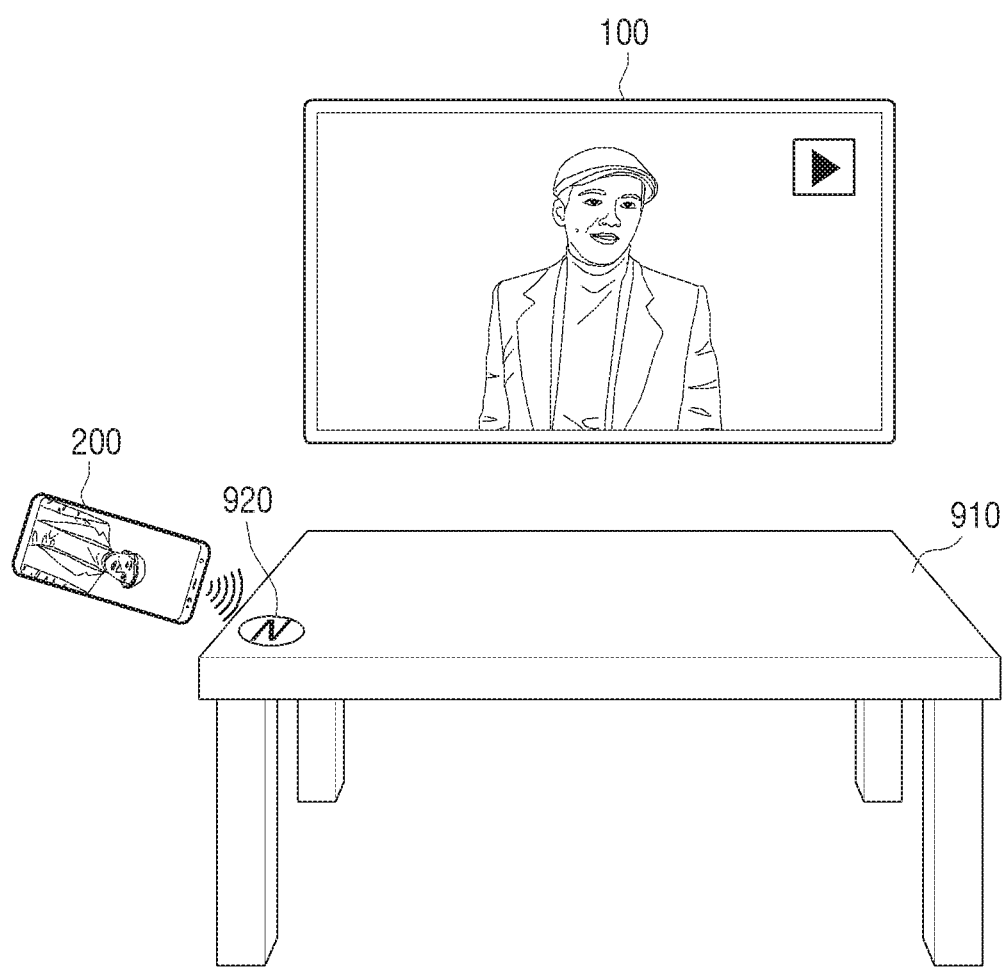
FIG. 9 is a view for describing a process in which the user terminal device is tagged to a near field communication (NFC) tag external to the display device according to an embodiment.
Figure 10:
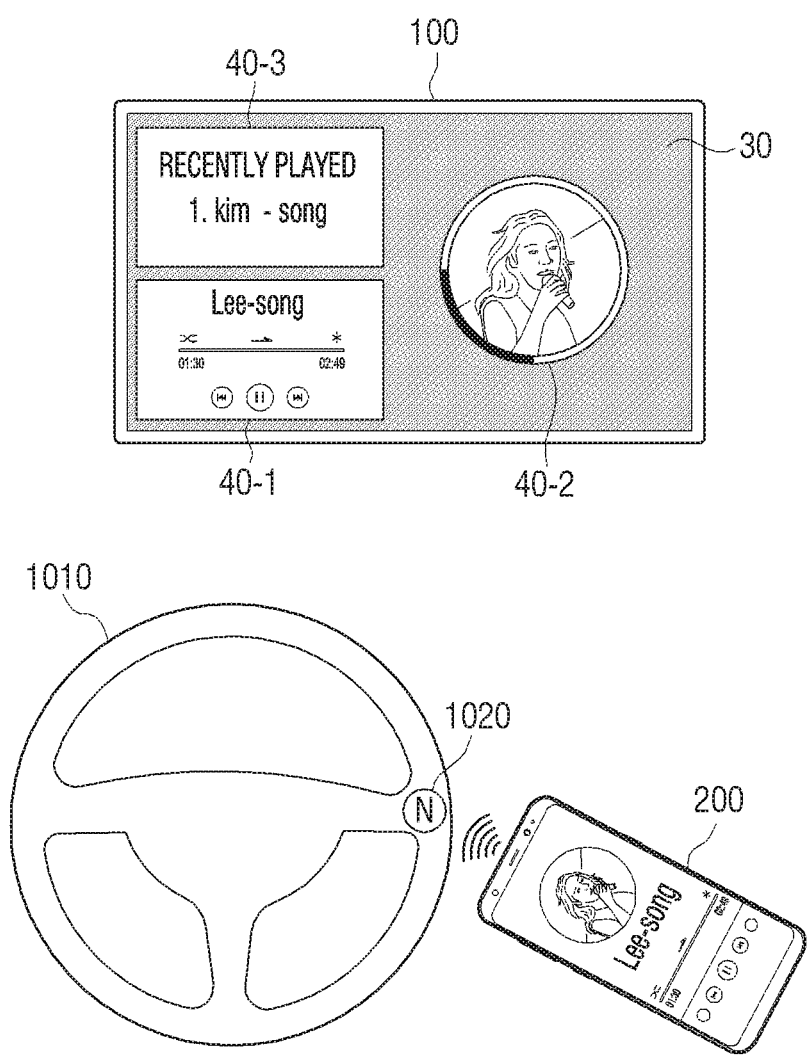
FIG. 10 is a view for describing a process in which the user terminal device is tagged to an NFC tag external to the display device, according to an embodiment of the disclosure.
Figure 11:
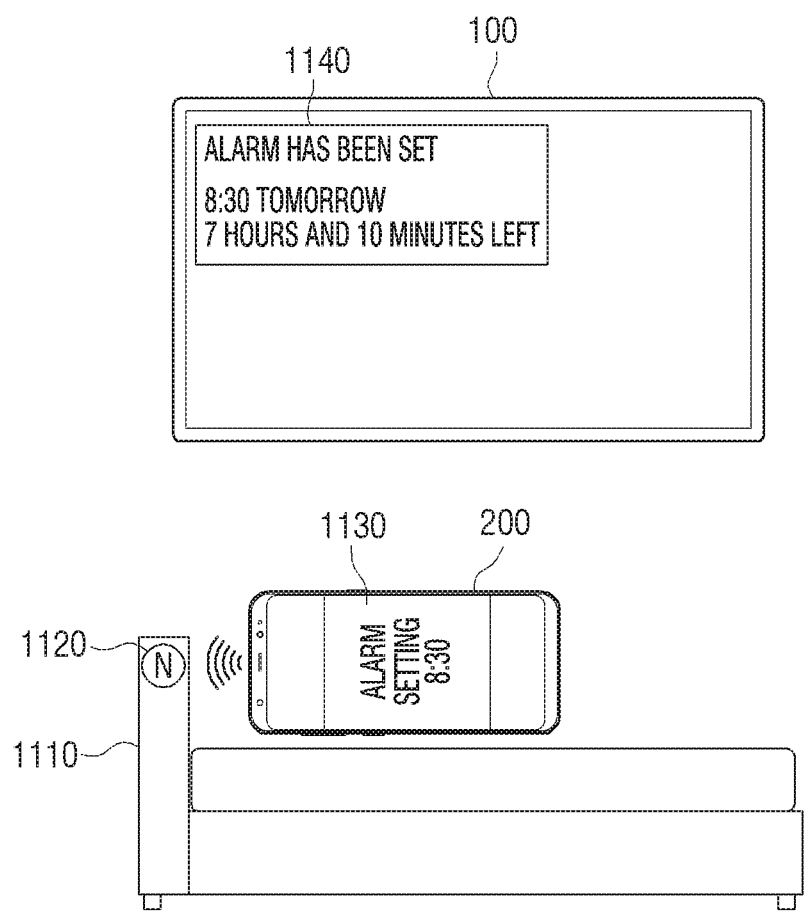
FIG. 11 is a view for describing a process in which the user terminal device is tagged to an NFC tag external to the display device according to an embodiment.

FIGS. 9 through 11 are views for describing a process in which the user terminal device 200 is brought within communicative proximity of an NFC tag external to the display device 100, according to an embodiment. Specifically, the NFC tag including information (e.g., a MAC address of the display device 100) associated with the display device 100, and connection information (e.g., a Bluetooth MAC address and a P2P device MAC address) may be external to the display device 100. That is, the NFC tag may be disposed externally to the display device 100, and the embodiments shown in FIGS. 9 through 11 are merely embodiments.

According to an embodiment, an NFC tag 920 may be disposed on a table 910 as shown in FIG. 9. Based on the user terminal device 200 being brought within communicative proximity of the NFC tag 920, the user terminal device 200 may receive, from the NFC tag 920, information associated with the display device 100 and connection information via NFC with the NFC tag 920. Further, the user terminal device 200 may connect to the display device 100 based on the received information.

The display device 100 may transmit, to the user terminal device 200, the signal that requests information associated with content that is currently being output via the user terminal device 200. Based on receiving the signal that requests the information associated with content, the user terminal device 200 may identify a type of the content that is currently being output, and transmit, to the display device 100, information associated with the content that is being output by using different communication methods according to the identified type of content. Referring to FIG. 9, based on video content being output via the user terminal device 200, the user terminal device 200 may transmit, to the display device 100, information associated with the video content by using P2P communication. Further, the display device 100 may display the video content and the indicator indicating that the video content is received, based on the received information associated with the video content. A detailed description of the screen on which the video content is output has been provided above with reference to FIGS. 5B and 5C, and thus redundant description may be omitted.

According to an embodiment, an NFC tag 1020 may be disposed on a vehicle handle 1010 as shown in FIG. 10.

Specifically, based on the user terminal device 200 being brought within communicative proximity of the NFC tag 1020, the user terminal device 200 may receive, from the NFC tag 1020, information associated with the display device 100 and connection information via NFC with the NFC tag 1020. Further, the user terminal device 200 may connect to the display device 100 based on the received information. The display device 100 may transmit, to the user terminal device 200, the signal that requests transmission of information associated with content that is being output via the user terminal device 200. Based on receiving the signal that requests the transmission of information associated with content, the user terminal device 200 may identify a type of the content that is currently being output, and transmit, to the display device 100, information associated with the content that is being output by using different communication methods according to the identified type of content. Referring to FIG. 10, based on audio content being output via the user terminal device 200, the user terminal device 200 may transmit, to the display device 100, information associated with the audio content by using Bluetooth communication. Then, the display device 100 may output the audio content based on the received information associated with the audio content and display, on the standby screen 30, the audio UIs 40-1, 40-2, and 40-3 that are different than the UI that is concurrently displayed via the user terminal device 200. A detailed description of the standby screen 30 and the audio UIs 40-1, 40-2, and 40-3 has been provided above with reference to FIGS. 6A and 6B, and thus redundant description may be omitted.

According to an embodiment, an NFC tag 1120 may be disposed on a bed 1110 as shown in FIG. 11. According to an embodiment, the NFC tag 1120 may include a control instruction for executing a specific application, in addition to information associated with the display device 100 and connection information. Specifically, based on the user terminal device 200 being brought within communicative proximity of the NFC tag 1120, the user terminal device 200 may receive, from the NFC tag 1120, information associated with the display device 100, connection information, and a control instruction for executing an alarm application. The user terminal device 200 may connect to the display device 100 based on the information received from the NFC tag 1120 via NFC, and execute an alarm application 1130.

Further, according to an embodiment, based on a user instruction (e.g., an instruction to set an alarm for 8:30 as shown in FIG. 11) being input to the application 1130 executed by the user terminal device 200, the user terminal device 200 may transmit a signal including the input instruction to the display device 100. Further, the display device 100 may display a notification UI 1140 that is generated based on the received signal and set alarm.

FIG. 11 illustrates a case where the NFC tag 1120 includes the control instruction for executing the alarm application, but this is merely an embodiment, and the NFC tag 1120 may include various control instructions.

Figure 12:
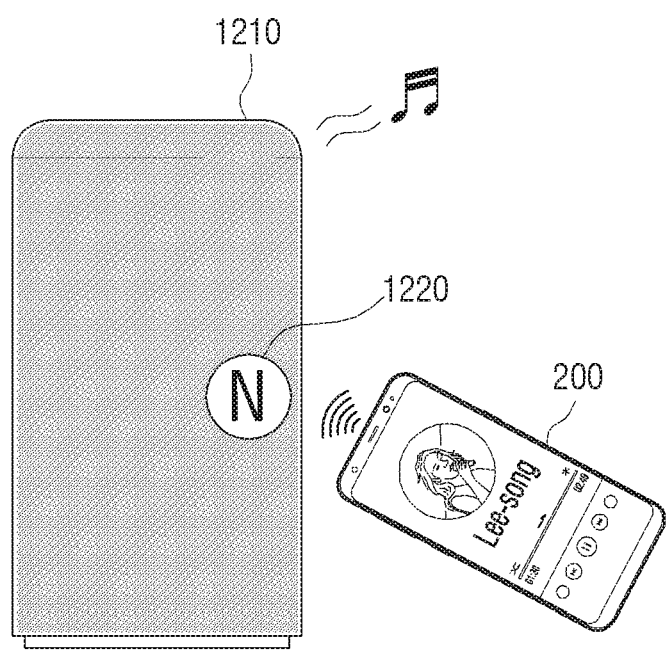
FIG. 12 is a view for describing a case where the display device is implemented by a speaker according to an embodiment.

FIG. 12 is a view for describing a case where the display device 100 is implemented by an AI speaker 1210, according to an embodiment. An NFC tag 1220 illustrated in FIG. 12 may include information (e.g., a MAC address of the AI speaker) associated with the AI speaker 1210, and connection information (e.g., a Bluetooth MAC address and a P2P device MAC address). In addition, the NFC tag 1220 may be embedded in the AI speaker 1210 or disposed on an outer portion of the AI speaker 1210.

Based on the user terminal device 200 being brought within communicative proximity of the NFC tag 1220, the user terminal device 200 may receive, from the NFC tag 1220, information associated with the AI speaker 1210 and connection information via NFC. The AI speaker 1210 may transmit, to the user terminal device 200, the signal that requests information associated with content that is currently being output via the user terminal device 200. Based on receiving the signal that requests information associated with content, the user terminal device 200 may identify a type of the content that is being output, and transmit, to the AI speaker 1210, information associated with the content by using different communication methods according to the identified type of content. In FIG. 12, based on audio content being output, the user terminal device 200 may transmit information associated with the audio content to the AI speaker 1210 by using Bluetooth communication. Further, the AI speaker 1210 may output the audio content based on the received information associated with the audio content.

In addition, based on the AI speaker 1210 being in a powered-off state, and based on the user terminal device 200 being brought within communicative proximity of the NFC tag 1220, the user terminal device 200 may transmit the wake-up signal to the AI speaker 1210. Based on receiving the wake-up signal, the AI speaker 1210 may be powered on to output the received content.

According to an embodiment, the AI speaker 1210 may not include the NFC tag 1220. In this case, based on detecting a content request event, the AI speaker 1210 may transmit, to the user terminal device 200, the signal that requests transmission of information associated with content that is currently being output via the user terminal device 200. The content request event may be an event in which the user terminal device 200 transmits, to the AI speaker 1210, a signal that induces transmission of the signal that requests information associated with content that is currently being output.

FIG. 12 illustrates a case where the display device 100 is implemented by an AI speaker 1210, but this is merely an embodiment, and the display device 100 may be implemented by various electronic devices such as a PC.

Figure 13A:
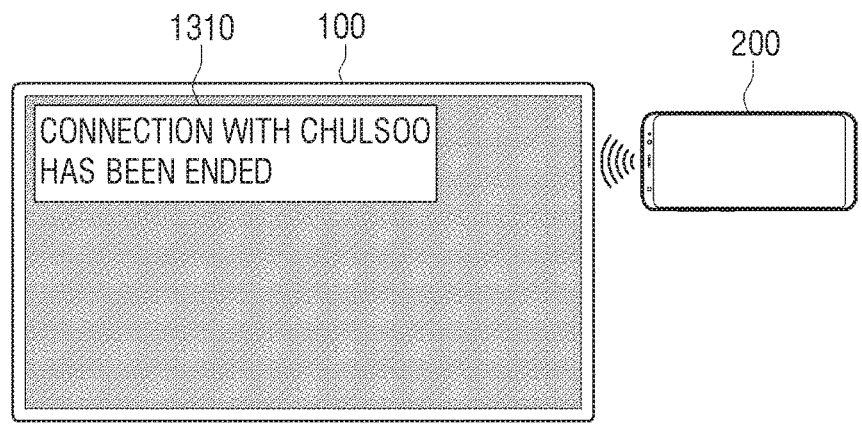
FIGS. 13A to 13C are views for describing processes in which a connection between the display device and the user terminal device is terminated according to an embodiment.
Figure 13B:
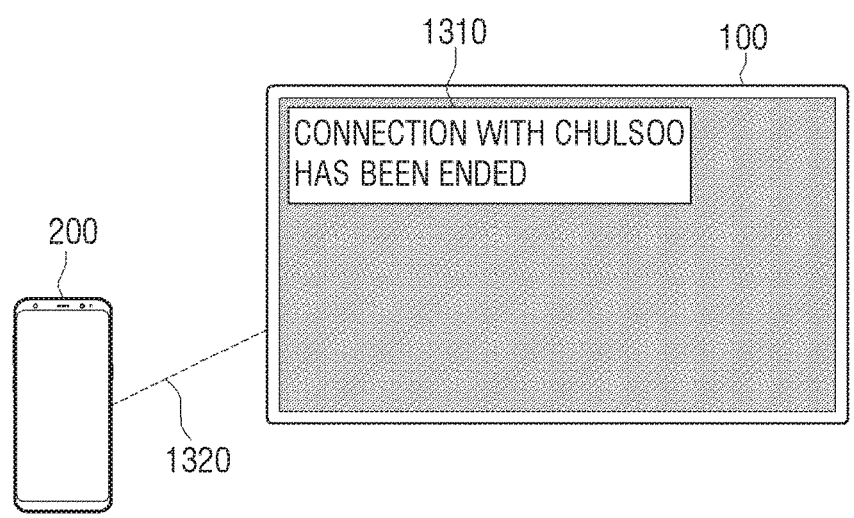
Figure 13C:
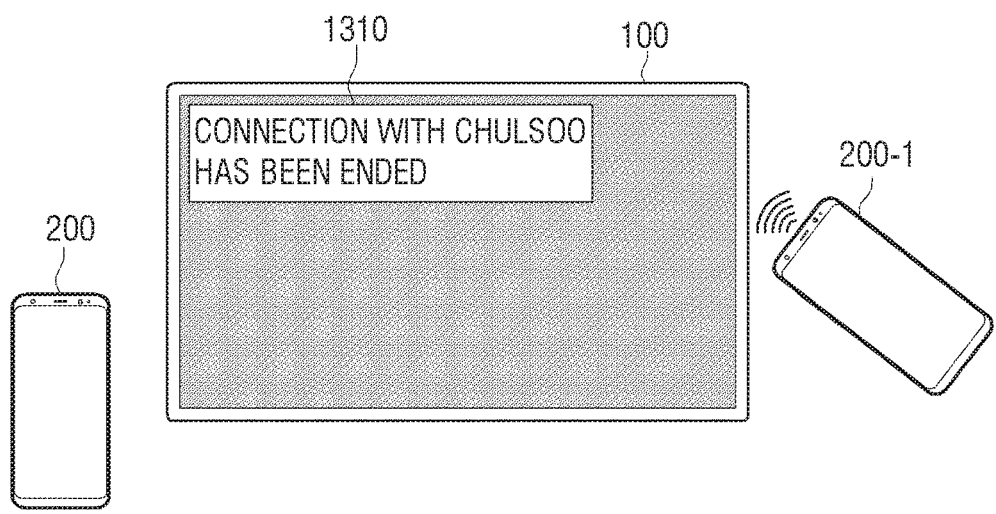

FIGS. 13A through 13C are views for describing processes in which a connection between the display device 100 and the user terminal device 200 is terminated according to an embodiment.

According to an embodiment, and as shown in FIG. 13A, based on the user terminal device 200 being brought within communicative proximity the display device 100 after a connection is established, the connection between the display device 100 and the user terminal device 200 may be ended. That is, based on the user terminal device 200 being brought within communicative proximity of the NFC tag of the display device 100 in a state in which the connection between the display device 100 and the user terminal device 200 is established, the connection may be ended. Put another way, the user of the user terminal device 200 may perform a first NFC tap to establish the connection, and perform a second NFC tap to end the connection. The display device 100 may display a UI 1310 indicating that the connection is ended. The UI 1310 indicating that communicative connection is ended may be a UI including a message "connection with Chulsoo has been ended" as shown in FIG. 13A, but this is merely an embodiment, and the UI 1310 may be implemented in various forms.

Alternatively, and according to an embodiment, based on the user terminal device 200 being moved away from the display device 100 by a distance exceeding a threshold distance 1320 in a state in which a connection between the display device 100 and the user terminal device 200 is established, the connection may be ended. Specifically, based on a distance between the user terminal device 200 and the display device 100 exceeding the threshold distance, the user terminal device 200 may transmit, to the display device 100, a signal that ends the connection. Based on receiving the signal that ends the connection, the display device 100 may end the connection with the user terminal device 200, and display the UI 1310 indicating that connection is ended.

According to an embodiment, based on another user terminal device 200-1 being brought within communicative proximity of the display device 100 in a state in which a connection between the display device 100 and the user terminal device 200 is established, the established connection may be ended. That is, based on another user terminal device 200-1 being brought within communicative proximity of the display device 100, the display device 100 may end the established connection with the user terminal device 200, and display the UI 1310 indicating that connection is ended. Further, the display device 100 may transmit, to the terminal device 200-1 that is more recently brought within communicative proximity, the signal that requests information associated with content that is currently being output.

Figure 14:
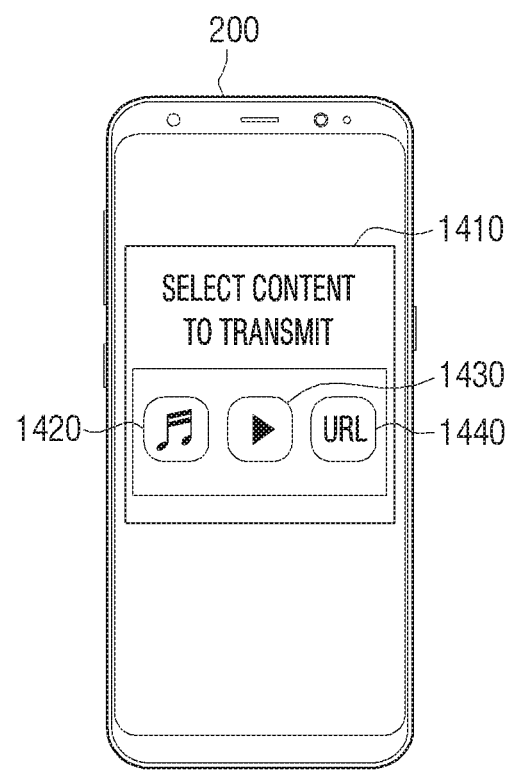
FIG. 14 is a view for describing a user interface (UI) for selecting content to be transmitted from the user terminal device to the display device according to an embodiment.

FIG. 14 is a view for describing a UI 1410 for selecting information associated with content to be transmitted from the user terminal device 200 to the display device 100 according to an embodiment.

Based on receiving the signal that requests information associated with content that is currently being output from the display device 100, the user terminal device 200 may display the UI 1410 for selecting information associated with content to be transmitted to the display device 100. Specifically, the UI 1410 for selecting information associated with content may include UIs 1420, 1430, and 1440 indicating content to be transmitted. The UI 1420 corresponding to audio content may have a musical note shape as shown in FIG. 14, but this is merely an embodiment, and the UI 1420 may be a UI including metadata of audio content. The UI 1430 corresponding to video content may have a play button shape as shown in FIG. 14, but this is merely an embodiment, and the UI 1430 may be a thumbnail icon of the video content or a UI including a title of the content, or the like. The UI 1440 corresponding to a uniform resource locator (URL) may be a UI in which a word "URL" is written as shown in FIG. 14, or may be a UI including a name of a website accessible via the URL, or control information for installing an application.

Based on information associated with content being selected via the UI 1410, the user terminal device 200 may transmit the selected information associated with content to the display device 100. Particularly, the user terminal device 200 may transmit the information associated with content to the display device 100 by using different communication methods according to a type of selected information associated with content. Further, the user terminal device 200 may utilize connection information (e.g., a Bluetooth MAC address and a P2P device MAC address) received from the display device 100 to transmit the information associated with content to the display device 100 by using different communication methods according to the type of selected content. According to an embodiment, based on the selected content being audio content, the user terminal device 200 may transmit information associated with the audio content to the display device 100 by using Bluetooth communication. Further, based on the selected content being video content, the user terminal device 200 may transmit information associated with the video content to the display device 100 by using P2P communication.

Figure 15A:
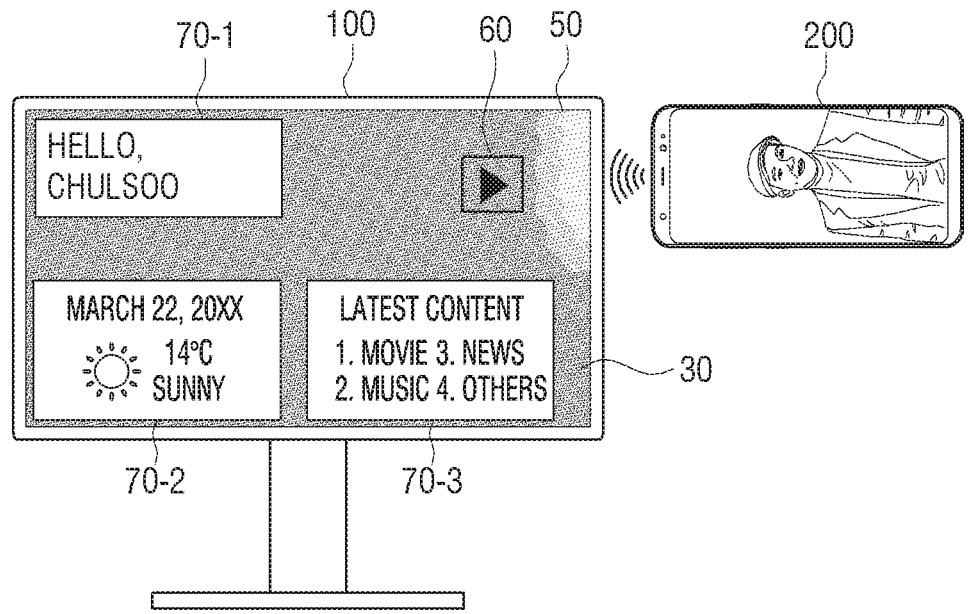
FIGS. 15A and 15B are views for describing a process in which the display device determines whether to rotate a display according to an embodiment.
Figure 15B:
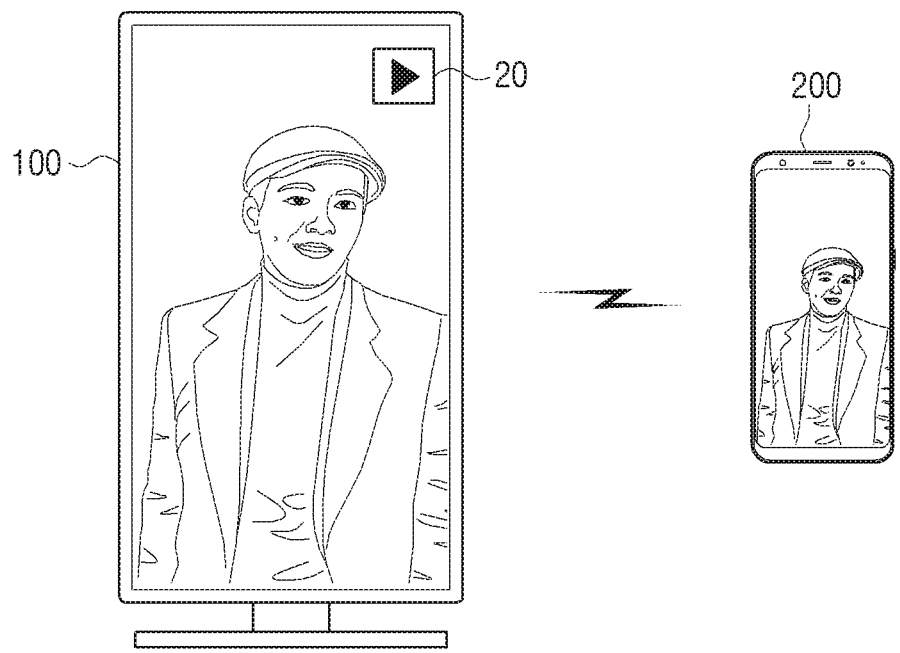

FIGS. 15A and 15B are views for describing a process in which the display device 100 determines whether to rotate the display 120 according to an embodiment.

First, as shown in FIG. 15A, based on the user terminal device 200 being brought within communicative proximity of the powered-off display device 100, the display device 100 may receive the wake-up signal from the user terminal device 200, and enter the standby mode in which the predetermined standby screen 30 is provided. A description of entering the standby mode has been provided above with reference to FIG. 5B, and thus a redundant description may be omitted.

Further, the display device 100 may determine whether to rotate the display 120 based on information associated with video content that includes information identifying orientation information of the video content received from the user terminal device 200. Specifically, the display device 100 may identify whether an orientation of the display 120 and an orientation of the video content are different from each other based on the information received from the user terminal device 200. Based on identifying that the orientation of the display 120 and the orientation of the video content are different from each other, the display device 100 may determine to rotate the display 120. According to an embodiment, and as shown in FIG. 15B, based on the information indicating that the orientation of the video content is a portrait orientation being received from the user terminal device 200 based on the orientation of the display 120 being a landscape orientation, the display device 100 may identify that the orientation of the display 120 and the orientation of the video content are different from each other. Further, the display device 100 may determine to rotate the display 120 into the portrait orientation, and rotate the display 120 into the determined orientation.

According to an embodiment, based on the information indicating that the orientation of the video content is the landscape orientation being received from the user terminal device 200 and based on the orientation of the display 120 being the portrait orientation, the display device 100 may identify that the orientation of the display 120 and the orientation of the video content are different from each other. Further, the display device 100 may determine to rotate the display 120 into the landscape orientation, and rotate the display 120 into the determined orientation.

According to an embodiment, based on the information indicating that orientation information of video content is changed being received from the user terminal device 200, the display device 100 may rotate the display 120 based on the information indicating that orientation information is changed. According to an embodiment, based on both of the orientation of the video content and the orientation of the display 120 being the landscape orientation, and based on information indicating that the orientation of the video content received from the user terminal device 200 is changed from the landscape orientation to the portrait orientation being received, the display device 100 may rotate the display 120 into the portrait orientation from the landscape orientation.

FIG. 16 is a flowchart for describing a method for controlling the display device 100 according to an embodiment. First, based on detecting a content request event associated with a request for the display device 100 to output information associated with content that is being output via the user terminal device 200, the display device 100 may request the user terminal device 200 for information associated with content that is being output via the user terminal device 200 (S1610). According to an embodiment, the content request event may be an event in which the user terminal device 200 is brought within communicative proximity of an NFC tag in which information associated with the display device 100 is stored. That is, a user of the user terminal device 200 may perform an NFC tap using the user terminal device 200. Put another way, the user may "tag" the user terminal device 200 to the NFC tag. Further, based on the user terminal device 200 being brought within communicative proximity of the display device 100 when the display device 100 is in a powered-off state, the display device 100 may receive the wake-up signal from the user terminal device 200. Based on receiving the wake-up signal, the display device 100 may enter the standby mode in which the predetermined standby screen is provided. Further, the display device 100 may display the indicator indicating that the user terminal device 200 is within communicative proximity (e.g., that an NFC tap or tag has been performed), on a region of the standby screen that corresponds to a position where the user terminal device 200 is within communicative proximity (e.g., where the NFC tap or tag was performed).

The display device 100 may identify a type of the received content (S1620). According to an embodiment, based on determining that the received content is video content, the display device 100 may display the video content based on the received information associated with the video content (S1630). Specifically, in a case where information associated with video content is received, the display device 100 may be switched from the standby mode to the normal mode, and display the video content and the indicator indicating that the video content is received based on the information associated with the video content.

According to an embodiment, in a case where information associated with audio content is received from the user terminal device 200, the display device 100 may display an audio UI that is different from a UI that is concurrently being displayed via the user terminal device 200, and output the audio content based on the received information associated with the audio content (S1640). Specifically, the display device 100 may generate the audio UI based on the received information associated with the audio content. Further, the display device 100 may output the audio content based on the information associated with the audio content, and display the audio UI on the standby screen.

Figure 17:
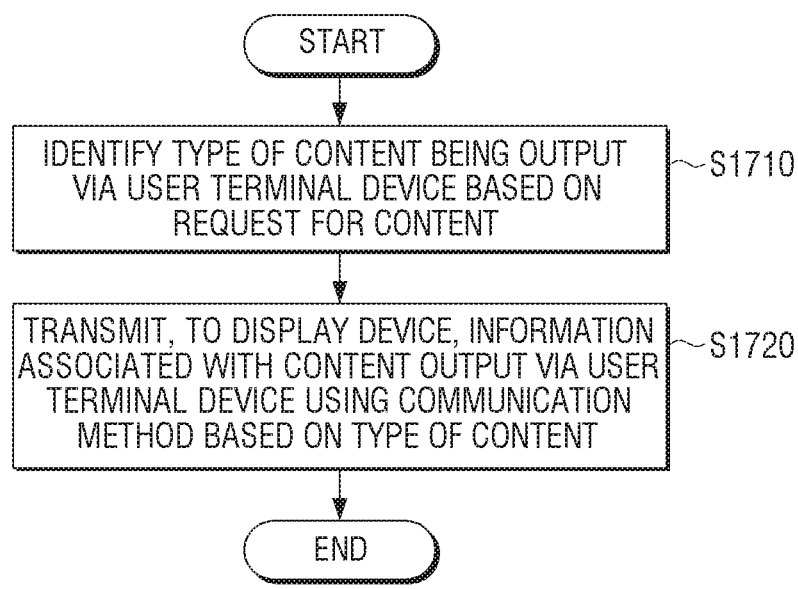
FIG. 17 is a flowchart for describing a method for controlling a user terminal device according to an embodiment.

FIG. 17 is a flowchart for describing a method for controlling the user terminal device 200 according to an embodiment. First, based on receiving the signal that requests information associated with content that is currently being output via the user terminal device 200 from the display device 100 while the content is output, the user terminal device 200 may identify a type of the content that is currently being output via the user terminal device 200. Specifically, the user terminal device 200 may analyze metadata of the content that is currently being output to identify whether the content is audio content or video content (S1710).

Further, the user terminal device 200 may transmit information associated with content that is being output via the user terminal device 200 to the display device 100 by using different communication methods based on the identified type of content (S1720). Specifically, in a case where the content that is being output is identified as audio content, the user terminal device 200 may transmit information associated with the audio content to the display device 100 by using Bluetooth communication. In a case where the content that is being played is identified as video content, the user terminal device 200 may transmit information associated with the video content to the display device 100 by using P2P communication.

As used herein, the terms "module" or a "[function]er/or" may denote a unit implemented in hardware, software, or firmware, and may be used interchangeably with a term such as logic, a logic block, a part, or a circuit. The terms "[function]er/or" or "module" may indicate an integrated part, or a minimum unit for performing one or more functions, or part thereof. For example, a module may be implemented by an ASIC.

Various embodiments of the disclosure may be implemented by software including instructions stored in a machine-readable storage medium (e.g., a non-transitory computer-readable medium). A machine may be a device that invokes the stored instruction from the storage medium and may be operated depending on the invoked instruction, and may include an electronic device (e.g., the display device 100) according to the disclosed embodiments. In the case where an instruction is executed by the processor, the processor may directly perform a function corresponding to the instruction or other components may perform the function corresponding to the instruction under a control of the processor. The instruction may include code created or executed by a compiler or an interpreter. The machine-readable storage medium may be provided in a form of a non-transitory storage medium. Here, the term "non-transitory" may mean that the storage medium is tangible, and might not distinguish whether data is semi-permanently or temporarily stored on the storage medium.

According to an embodiment, the methods according to the embodiments may be included and provided in a computer program product. The computer program product may be traded as a product between a seller and a purchaser. The computer program product may be distributed in a form of a storage medium (e.g., a compact disc read only memory (CD-ROM)) that may be read by the machine or online through an application store (e.g., PlayStore™). In the case of the online distribution, at least portions of the computer program product may be at least temporarily stored in a storage medium such as a memory of a server of a manufacturer, a server of an application store, or a relay server or be temporarily created.

In addition, each of components (e.g., modules or programs) according to the diverse embodiments described above may include a single entity or a plurality of entities, and some of the corresponding sub-components described above may be omitted or other sub-components may be further included in the embodiments. Alternatively or additionally, some of the components (e.g., the modules or the programs) may be integrated into a single entity, and may perform functions performed by the respective corresponding components before being integrated in the same or similar manner. Operations performed by the modules, the programs, or other components according to the embodiments may be executed in a sequential manner, a parallel manner, an iterative manner, or a heuristic manner, at least some of the operations may be performed in a different order or be omitted, or other operations may be added.

What is claimed is:

1. A display device comprising:
a communication interface configured to communicate with a first user terminal device;
a display;
a memory configured to store at least one instruction; and
a processor configured to execute the at least one instruction to:
in response to the first user terminal device being within communicative proximity of the display device while the display device is in a powered-off state, enter a standby mode in which a predetermined standby screen is displayed via the display;

control the display to display an indicator indicating that the first user terminal device is within communicative proximity of the display device, on a region corresponding to a position where the first user terminal device is within communicative proximity of the display device, based on entering the standby mode;

receive information associated with content using a communication method corresponding to a type of the content that is being output via the first user terminal device from the first user terminal device via the communication interface;

based on the type of the content that is being output via the first user terminal device being video content, control the display to display the video content based on information associated with the video content that is received from the first user terminal device; and based on the type of the content that is being output via the first user terminal device being audio content, control the display to display an audio user interface (UI) that is different than a UI that is concurrently being displayed via the first user terminal device on the standby screen, and control the display device to output the audio content, based on information associated with the audio content that is received from the first user terminal device, wherein the processor is further configured to execute the at least one instruction to:

based on a second user terminal device being within communicative proximity of the display device in a state in which a connection between the display device and the first user terminal device is established, terminate the connection, display a UI indicating that the connection is terminated, and transmit a signal that requests information associated with content that is currently being output by the second user terminal device to the second user terminal device.

2. The display device of claim 1, further comprising:

a near field communication (NFC) interface having an NFC tag that stores information associated with the display device and connection information, wherein the processor is configured to receive the information associated with the content in response to the first user terminal device being brought within communicative proximity of the NFC tag of the display device, and the connection information includes information associated with a connection method by which the information associated with the content that is output via the first user terminal device is receivable.

3. The display device of claim 2, wherein the processor is configured to:

receive a wake-up signal via the NFC interface and enter the standby mode in which the predetermined standby screen is displayed via the display, based on the first user terminal device being brought within communicative proximity of the display device while the display device is in the powered-off state; and control the display to display the audio UI via the standby screen based on the audio content being received from the first user terminal device.

4. The display device of claim 3, wherein the processor is configured to:

based on the type of the content that is being output via the first user terminal device being video content, switch a mode of the display device from the standby mode to a normal mode; and control the display to display the video content and an indicator indicating that the information associated with the video content is received from the first user terminal device.

5. The display device of claim 1, wherein the processor is configured to:

based on the type of the content that is being output via the first user terminal device being video content received from an external server, receive, from the external server via the communication interface, a portion of the video content that corresponds to a current playback point of the video content that is being output via the first user terminal device; and control the display to display the portion of the video content based on the information associated with the video content that includes information identifying a title of the video content, and the current playback point of the video content that is being output via the first user terminal device.

6. A first user terminal device comprising:

a display;

a communication interface configured to communicate with a display device;

a memory configured to store at least one instruction; and a processor configured to execute the at least one instruction to:

in response to the first user terminal device being within communicative proximity of the display device while the display device is in a powered-off state, transmit a wake-up signal to the display device that causes the display device to enter a standby mode in which a predetermined standby screen is displayed via a display of the display device and causes the display device to display an indicator, indicating that the first user terminal device is within communicative proximity of the display device, on a region corresponding to a position where the first user terminal device is within communicative proximity of the display device, receive a signal that requests information associated with content that is being output via the first user terminal device from the display device, identify a type of the content that is being output via the first user terminal device; and control the communication interface to transmit, to the display device, the information associated with the content that is being output via the first user terminal device by using a communication method corresponding to the identified type of the content, wherein the processor is configured to control the communication interface to transmit, to the display device, the information associated with the content by using a first communication method based on the content being video content, and by using a second communication method based on the content being audio content, wherein the display device is configured to, based on a second user terminal device being within communicative proximity of the display device in a state in which a connection between the display device and the first user terminal device is established, terminate the connection, display a UI indicating that the connection is terminated, and transmit a signal that requests information associated with content that is currently being output by the second user terminal device to the second user terminal device.

7. The first user terminal device of claim 6, wherein the processor is configured to:
based on the content being the audio content, control the communication interface to transmit information associated with the audio content by using the second communication method of Bluetooth communication; and
based on the content being the video content, control the communication interface to transmit information associated with the video content by using the first communication method of peer-to-peer (P2P) communication.

8. The first user terminal device of claim 6, wherein the processor is configured to:
based on receiving, from the display device, the signal that requests the information associated with the content that is being output via the first user terminal device, control the display to display a user interface (UI) for selecting information associated with content to be transmitted to the display device; and
based on the information associated with the content being selected via the UI, control the communication interface to transmit the selected information associated with the content to the display device.

9. A method for controlling a display device, the method comprising:
in response to a first user terminal device being within communicative proximity of the display device while the display device is in a powered-off state, entering a standby mode in which a predetermined standby screen is displayed via a display of the display device;
receiving information associated with content using a communication method corresponding to a type of the content that is being output via the first user terminal device from the first user terminal device;
displaying, based on the type of the content that is being output via the first user terminal device being video content, the video content based on information associated with the video content that is received from the first user terminal device;
displaying, based on the type of the content that is being output via the first user terminal device being audio content, an audio user interface (UI) that is different than a UI that is concurrently being displayed via the first user terminal device on the standby screen, and outputting the audio content, based on information associated with the audio content that is received from the first user terminal device;
based on a second user terminal device being within communicative proximity of the display device in a state in which a connection between the display device and the first user terminal device is established, terminating the connection;
displaying a UI indicating that the connection is terminated; and
transmitting a signal that requests information associated with content that is currently being output by the second user terminal device to the second user terminal device,
wherein the entering of the standby mode includes displaying an indicator indicating that the first user terminal device is within communicative proximity of the display device, on a region corresponding to a position where the first user terminal device is within communicative proximity of the display device, based on entering the standby mode.

10. The method of claim 9, wherein the receiving the information associated with the content comprises receiving the information in response to the first user terminal device being brought within communicative proximity of a near field communication (NFC) tag of the display device.

11. The method of claim 10, wherein the displaying of the audio UI includes:
receiving a wake-up signal and entering the standby mode in which the predetermined standby screen is provided, based on the first user terminal device being brought within communicative proximity of the display device while the display device is in the powered-off state; and
displaying the audio UI via the standby screen based on the audio content being received from the first user terminal device.

12. The method of claim 11, wherein the displaying of the video content includes:
based on the information associated with the video content being received from the first user terminal device, switching a mode of the display device from the standby mode to a normal mode; and
displaying the video content and an indicator indicating that the information associated with the video content is received from the first user terminal device.

13. The method of claim 9, wherein the displaying of the video content includes:
receiving, based on the type of the content that is being output via the first user terminal device being video content received from an external server, a portion of the video content corresponding to a current playback point of the video content that is being output via the first user terminal device, from the external server based on information associated with the video content including information identifying a title of the video content, and the current playback point of the video content that is being output via the first user terminal device.

14. A method for controlling a first user terminal device, the method comprising:
in response to the first user terminal device being within communicative proximity of a display device while the display device is in a powered-off state, transmitting a wake-up signal to the display device that causes the display device to enter a standby mode in which a predetermined standby screen is displayed via a display of the display device and causes the display device to display an indicator, indicating that the first user terminal device is within communicative proximity of the display device, on a region corresponding to a position where the first user terminal device is within communicative proximity of the display device;
identifying a type of content that is being output via the first user terminal device, based on receiving a signal that requests information associated with the content that is being output via the first user terminal device from the display device; and
transmitting, to the display device, the information associated with the content that is being output via the first user terminal device using a communication method corresponding to the identified type of the content, wherein the transmitting the information associated with the content comprises transmitting the information associated with the content using a first communication method based on the content being video content, and using a second communication method based on the content being audio content, wherein the display device is configured to, based on a second user terminal device being within communicative proximity of the display device in a state in which a connection between the display device and the first user terminal device is established, terminate the connection, display a UI indicating that the connection is terminated, and transmit a signal that requests information associated with content that is currently being output by the second user terminal device to the second user terminal device.

15. The method of claim 14, wherein the transmitting includes:
transmitting, based on the content being the audio content, information associated with the audio content by using the second communication method of Bluetooth communication; and
transmitting, based on the content being the video content, information associated with the video content by using the first communication method of peer-to-peer (P2P) communication.

16. The method as claimed in claim 14, wherein the transmitting includes:
displaying a user interface (UI) for selecting information associated with content to be transmitted to the display device, based on receiving the signal that requests information associated with the content that is being output via the first user terminal device from the display device; and
transmitting, based on the information associated with the content being selected via the UI, the selected information associated with the content to the display device.

17. A display device comprising:
a memory configured to store one or more instructions; and
a processor configured to execute the one or more instructions to:
in response to a first user terminal device being brought within communicative proximity of the display device while the display device is in a powered-off state, enter a standby mode in which a predetermined standby screen is displayed via a display of the display device;
control the display device to display an indicator indicating that the first user terminal device is within communicative proximity of the display device, on a region corresponding to a position where the first user terminal device is within communicative proximity of the display device, based on entering the standby mode;
provide, to the first user terminal device, connection information that permits the first user terminal device to transmit audio content or video content that is output via the first user terminal device to the display device using a communication method corresponding to a type of content that is being output via the first user terminal device, based on detecting the NFC with the first user terminal device;
control the display to display the video content that is received from the first user terminal device using a first communication method, based on the first user terminal device outputting the video content;
control the display device to output the audio content that is received from the first user terminal device using a second communication method, based on the first user terminal device outputting the audio content;
control the display to display an audio user interface (UI) that is different than a user interface that is being concurrently displayed via the first user terminal device on the standby screen, based on controlling the display device to output the audio content;
based on a second user terminal device being within communicative proximity of the display device in a state in which a connection between the display device and the first user terminal device is established, terminate the connection; display a UI indicating that the connection is terminated; and
transmit a signal that requests information associated with content that is currently being output by the second user terminal device to the second user terminal device.

18. A first user terminal device comprising:
a memory configured to store one or more instructions; and
a processor configured to execute the one or more instructions to:
in response to the first user terminal device being within communicative proximity of a display device while the display device is in a powered-off state, transmit a wake-up signal to the display device that causes the display device to enter a standby mode in which a predetermined standby screen is displayed via a display of the display device and causes the display device to display an indicator, indicating that the first user terminal device is within communicative proximity of the display device, on a region corresponding to a position where the first user terminal device is within communicative proximity of the display device;
receive, from the display device and via near field communication (NFC), connection information that permits the first user terminal device to transmit, using a communication method corresponding to a type of content that is being output via the first user terminal device, audio content or video content to the display device, based on the first user terminal device being brought within communicative proximity of the display device;
transmit, to the display device, the video content using a first communication method, based on receiving the connection information; and
transmit, to the display device, the audio content using a second communication method, based on receiving the connection information,
wherein the display device is configured to, based on a second user terminal device being within communicative proximity of the display device in a state in which a connection between the display device and the first user terminal device is established, terminate the connection, display a UI indicating that the connection is terminated, and transmit a signal that requests information associated with content that is currently being output by the second user terminal device to the second user terminal device.

* * * * *